US012775481B2

(12) United States Patent
Falcon et al.

(10) Patent No.: US 12,775,481 B2
(45) Date of Patent: Oct. 27, 2026

(54) VIRTUAL MACHINE LEARNING DEVELOPMENT ENVIRONMENT

(71) Applicant: Grid.ai, Inc., New York, NY (US)

(72) Inventors: Williams Falcon, New York, NY (US); Thomas Henri Marceau Chaton, New York, NY (US); Karolis Rusenas, New York, NY (US); Ethan Harris, New York, NY (US)

(73) Assignee: Grid.ai, Inc., New York, NY (US)

( * ) Notice: Subject to any disclaimer, the term of this patent is extended or adjusted under 35 U.S.C. 154(b) by 0 days.

(21) Appl. No.: 18/772,998

(22) Filed: Jul. 15, 2024

(65) Prior Publication Data

US 2025/0021361 A1 Jan. 16, 2025

Related U.S. Application Data

(60) Provisional application No. 63/526,749, filed on Jul. 14, 2023.

(51) Int. Cl.
*G06F 9/455* (2018.01)
*G06T 1/20* (2006.01)

(52) U.S. Cl.
CPC ............ *G06F 9/45508* (2013.01); *G06T 1/20* (2013.01)

(58) Field of Classification Search
CPC .............................. G06F 9/45508; G06T 1/20
See application file for complete search history.

(56) References Cited

U.S. PATENT DOCUMENTS

| | | | | |
|---|---|---|---|---|
| 5,428,803 | A | 6/1995 | Chen et al. | |
| 6,715,141 | B1 | 3/2004 | Hodge | |
| 7,603,327 | B2 | 10/2009 | Esfahany | |
| 8,332,828 | B2 | 12/2012 | Vargas | |
| 8,560,761 | B2 | 10/2013 | Tzeng | |
| 9,256,415 | B2 | 2/2016 | Asare et al. | |
| 9,800,466 | B1 | 10/2017 | Rangole | |
| 10,152,265 | B1 * | 12/2018 | Tomayko | H04L 61/45 |
| 10,725,745 | B2 | 7/2020 | Yao et al. | |
| 11,361,253 | B2 | 6/2022 | Falcon et al. | |
| 11,367,021 | B2 | 6/2022 | Capelo et al. | |
| 11,379,140 | B2 | 7/2022 | Capelo et al. | |
| 11,386,205 | B2 | 7/2022 | Lancioni et al. | |
| 11,700,292 | B2 | 7/2023 | Curry et al. | |
| 11,900,084 | B2 | 2/2024 | Falcon et al. | |
| 12,067,482 | B1 | 8/2024 | Perumalla et al. | |
| 2006/0271920 | A1 | 11/2006 | Abouelsaadat | |

(Continued)

FOREIGN PATENT DOCUMENTS

CN 114237853 A 3/2022

OTHER PUBLICATIONS

David, Henrique Miguel Castilho. Development of a Machine Learning Platform. Diss. Universidade Nova de Lisboa, 2020. (Year: 2020).*

(Continued)

*Primary Examiner* — Joanne G Macasiano

(57) ABSTRACT

In variants, the system can include a cloud-based platform hosting a set of virtual spaces each including a set of projects, wherein each project can include an environment and a set of code. The cloud-based platform can enable users to develop application code as if they were on a local device, and scale the application with little or no additional manual input.

20 Claims, 19 Drawing Sheets

(56) References Cited

U.S. PATENT DOCUMENTS

| | | | |
|---|---|---|---|
| 2009/0094614 | A1 | 4/2009 | Klementiev et al. |
| 2009/0100425 | A1* | 4/2009 | Russell .................. H04L 67/01 718/1 |
| 2010/0146478 | A1 | 6/2010 | Head et al. |
| 2011/0067030 | A1 | 3/2011 | Isard et al. |
| 2012/0185532 | A1* | 7/2012 | Kristiansson ......... H04L 67/125 709/203 |
| 2012/0271927 | A1 | 10/2012 | Shakirzyanov et al. |
| 2014/0282400 | A1* | 9/2014 | Moorthi ............. G06F 9/45558 717/122 |
| 2014/0316543 | A1 | 10/2014 | Sharma et al. |
| 2015/0339217 | A1 | 11/2015 | Avgerinos et al. |
| 2016/0328105 | A1 | 11/2016 | Chandra et al. |
| 2017/0006135 | A1 | 1/2017 | Siebel et al. |
| 2017/0010978 | A1* | 1/2017 | Stabrawa ............. G06F 3/0631 |
| 2017/0154425 | A1 | 6/2017 | Pierce et al. |
| 2017/0249349 | A1 | 8/2017 | Bhat et al. |
| 2018/0054490 | A1 | 2/2018 | Wadhwa et al. |
| 2018/0074870 | A1 | 3/2018 | Park et al. |
| 2018/0293463 | A1 | 10/2018 | Brown |
| 2018/0300174 | A1 | 10/2018 | Karanasos et al. |
| 2018/0341502 | A1 | 11/2018 | Rabasa et al. |
| 2019/0065323 | A1 | 2/2019 | Dhamdhere et al. |
| 2019/0147068 | A1 | 5/2019 | Tuggle |
| 2019/0156246 | A1 | 5/2019 | Kuo et al. |
| 2019/0182627 | A1 | 6/2019 | Thoresen et al. |
| 2019/0206020 | A1 | 7/2019 | Ould-Ahmed-Vall et al. |
| 2019/0228261 | A1 | 7/2019 | Chan |
| 2019/0253368 | A1 | 8/2019 | Kim et al. |
| 2019/0334868 | A1 | 10/2019 | Tewari et al. |
| 2020/0057441 | A1 | 2/2020 | Wang et al. |
| 2020/0065118 | A1 | 2/2020 | Nag et al. |
| 2020/0089817 | A1 | 3/2020 | Pinel et al. |
| 2020/0097847 | A1 | 3/2020 | Convertino et al. |
| 2020/0160229 | A1 | 5/2020 | Atcheson |
| 2020/0193221 | A1 | 6/2020 | Aftab et al. |
| 2020/0234120 | A1 | 7/2020 | Matsuo |
| 2021/0089295 | A1 | 3/2021 | Hart et al. |
| 2021/0150416 | A1 | 5/2021 | Ghanea-Hercock |
| 2021/0182729 | A1 | 6/2021 | George et al. |
| 2021/0192282 | A1 | 6/2021 | Goodsitt et al. |
| 2021/0200611 | A1 | 7/2021 | Barnum et al. |
| 2021/0271986 | A1 | 9/2021 | Hu et al. |
| 2021/0279644 | A1 | 9/2021 | Givental et al. |
| 2021/0326176 | A1* | 10/2021 | Maiyuran ........... G06F 9/38885 |
| 2021/0342725 | A1* | 11/2021 | Marsden ............... G06F 18/217 |
| 2021/0382717 | A1* | 12/2021 | Jiang ................... G06F 9/30087 |
| 2022/0058523 | A1* | 2/2022 | Falcon ................. G06N 3/0475 |
| 2022/0107744 | A1* | 4/2022 | Capelo ................... G06N 20/00 |
| 2022/0171648 | A1 | 6/2022 | Rodriguez et al. |
| 2023/0085946 | A1 | 3/2023 | Nolan et al. |
| 2023/0367620 | A1* | 11/2023 | Wilson ..................... G06N 3/09 |
| 2024/0176633 | A1 | 5/2024 | Falcon et al. |

OTHER PUBLICATIONS

Farrell, Steven, et al. "MLPerf™ HPC: A holistic benchmark suite for scientific machine learning on HPC systems." 2021 IEEE/ACM Workshop on Machine Learning in High Performance Computing Environments (MLHPC). IEEE, 2021. (Year: 2021).*

Sung, Nako, et al. "Nsml: A machine learning platform that enables you to focus on your models." arXiv preprint arXiv: 1712.05902 (2017). (Year: 2017).*

Chari, K , "Enterprise-wise Decision Support Systems: An Intelligent Approach", /University of South Florida, Information System/ Decision Sciences. Jul. 1999 (retrieved on Dec. 4, 2021)., p. 3, para 2-3, p. 4, para 2, p. 9, para 3, p. 10, para 2, p. 30, para 5—p. 31, para 1, Fig. 1, 3.

Manjhi, Amit Kumar, "Using a Shebang to Run Python Scripts", Level Up Coding, Mar. 25, 2023.

Stevens, E. , et al., "Deep Learning With PyTorch", Manning Publications. Jun. 15, 2020. (retrieved on Dec. 3, 2021). Retrieved from the internet: <http://pytorch.org/assets/deep-learning/Deep-Learning-with-PyTorch.pdf>, entire document, especially p. 10, para 6.

Borda , "Lightning-AI/ pytorch-lightning Public Commit clean imports (#2867)", Aug. 8, 2020 (Aug. 8, 2020), pp. 1-80, XP093204268, Retrieved from the Internet: URL:https://github.com/Lightning-AI/pytorch-lightning/comrnit/b7d72706c3696afafb2519e, 3ff3715d2bf295606; [retrieved on Sep. 12, 2024] * the whole document*.

"Lightning-Ai/pytorch-lightning", Public Commit clean imports(#2867), Borda, Aug. 8, 2020, pp. 1-32, https://github.com/Lightning-AI/pytorch-lightning/commit/b7d72706c3696afafb2519e3ff3715d2bf295606.

"Multiple arguments in shebang", Unix and Linux; 11 pages, [online][retrieved on Jul. 8, 2025]. Retrieved from <https://unix.stackexchange.com/questions/399690/multiple-arguments-in-shebang> (Year: 2017).

* cited by examiner

VIRTUAL MACHINE LEARNING DEVELOPMENT ENVIRONMENT

CROSS REFERENCE TO RELATED APPLICATIONS

This application claims the benefit of U.S. Provisional Application No. 63/526,749 filed 14 Jul. 2023, each of which is incorporated in its entirety by this reference.

TECHNICAL FIELD

This invention relates generally to the development environment field, and more specifically to a new and useful virtual machine learning development environment in the development environment field.

DETAILED DESCRIPTION

The following description of the embodiments of the invention is not intended to limit the invention to these embodiments, but rather to enable any person skilled in the art to make and use this invention.

1. Overview

Figure 1:
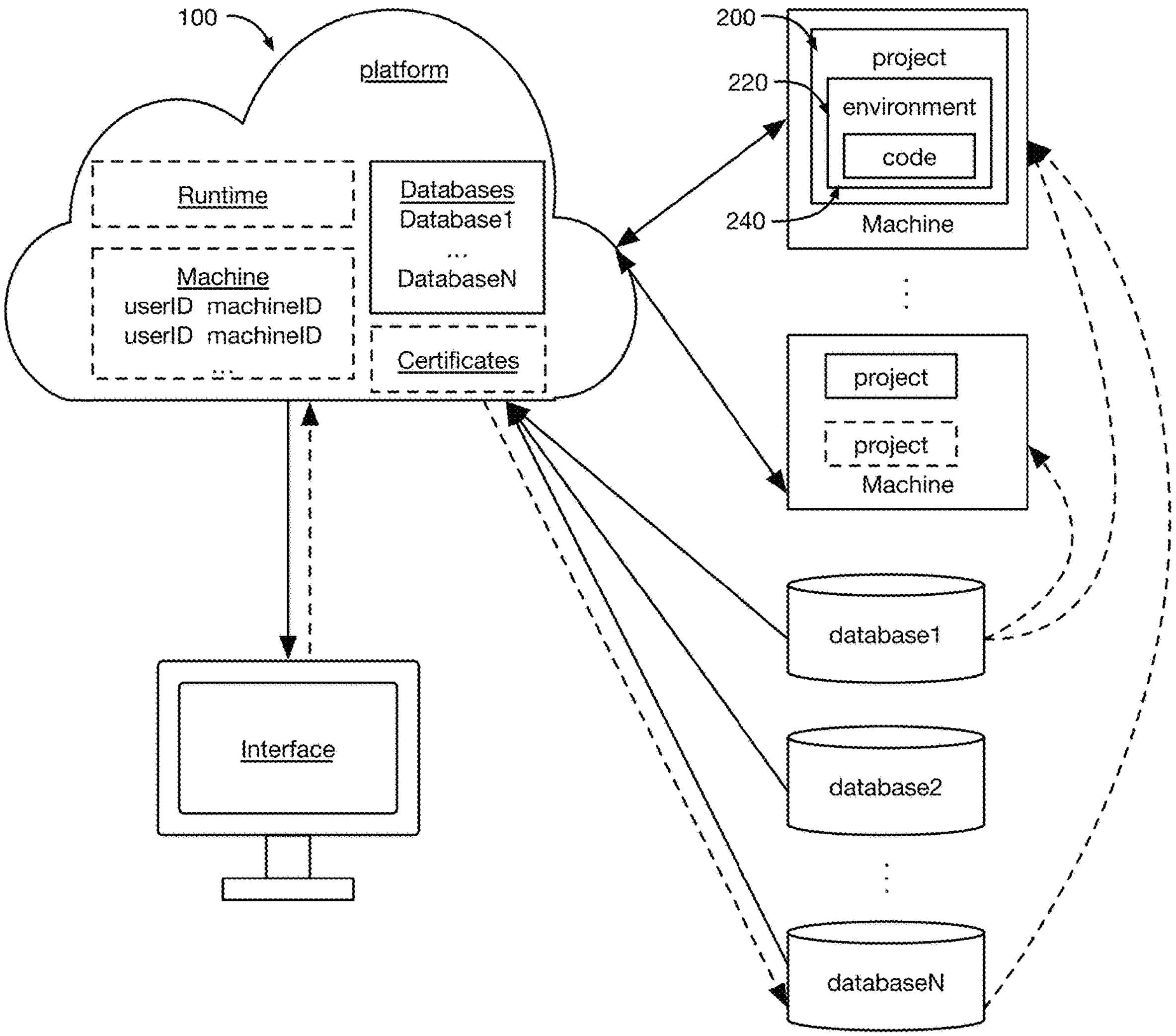
FIG. 1 is a schematic representation of a variant of a system.
Figure 11:
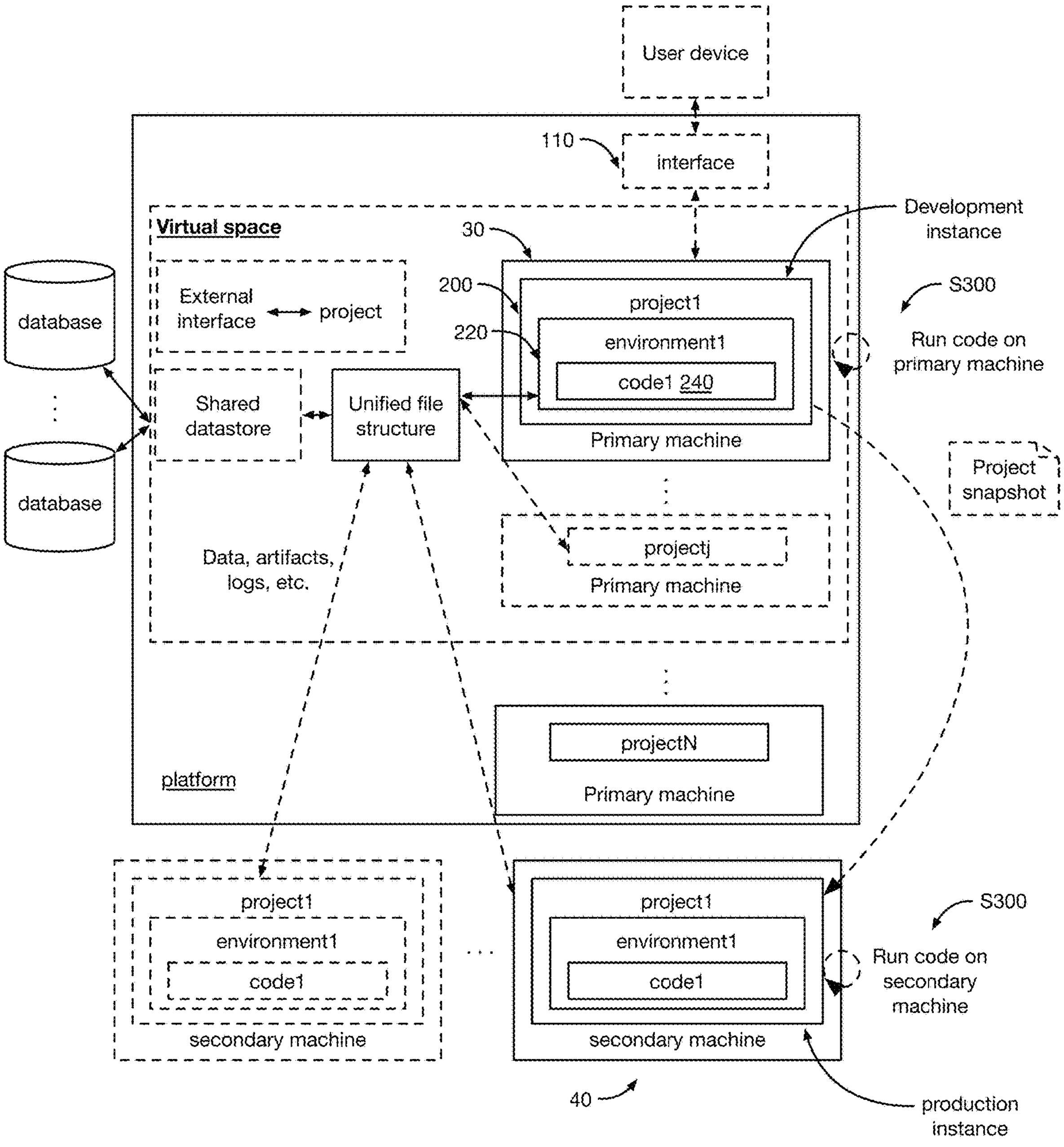
FIG. 11 is a schematic representation of a variant of the system.

In variants, the system can include: a platform 100; an interface 110; and a set of virtual spaces, each including a set of projects 200 and a unified file structure, examples shown in FIG. 1 and FIG. 11. In variants, the system can enable users to develop and/or execute machine learning code in a virtual environment, deploy the code on a distributed computing system (e.g., in real- or near-real time), and easily share projects and data via the unified file structure.

In an illustrative example, the system can include a control plane 100 supporting a plurality of virtual spaces, wherein each virtual space includes a set of persistent projects 200 and a shared datastore. Each project 200 can include an environment 220 and code 240. In examples, the environments 220 can be virtual environments and be hardware agnostic. In examples the system can be a cloud-based system.

In operation, a user can develop code (e.g., application code) within an environment 220 on a primary device 30 having a primary device type (e.g., a CPU), and scale the same environment 220 on one or more devices of the same or different type (e.g., any number of GPUs). When the user scales the environment (e.g., starts a "job"; starts a production environment; etc.), the control plane can automatically: initialize a set of secondary devices 40 (e.g., wherein the number and type of device can be specified by the user); fork the environment (e.g., create a snapshot, logical snapshot, clone, etc.); initialize the environment on each of the set of secondary devices 40; optionally connect the environments to the shared datastore; and run the code in each of the environments. In examples, the environment 220 and code 240 can be scaled to the secondary devices 40 with only a single action, such as clicking a button after selecting the number and type of secondary devices, or accessing a URI associated with the environment and code. In examples, the same code that the user developed on the primary environment (e.g., on the primary device) can be executed in the secondary environments (e.g., on the secondary devices) without any code changes (e.g., when the code is written using the PyTorch Lightning library, etc.). In examples, the datastore can be used to coordinate between the jobs, wherein the code on each secondary environment can read and/or write to the datastore. In examples, an orchestrator job can additionally be initialized to coordinate execution across the jobs.

Figure 14A:
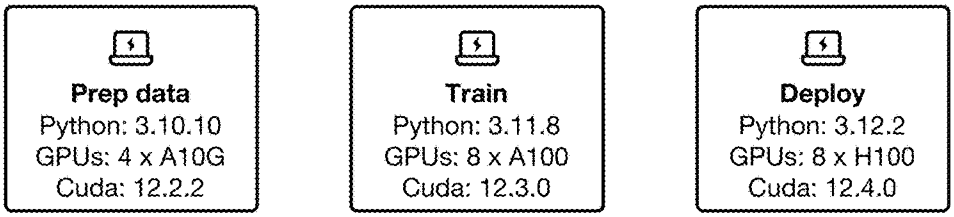
FIG. 14A is an illustrative example of different types of projects, with different machine and/or environment parameters.
Figure 14B:
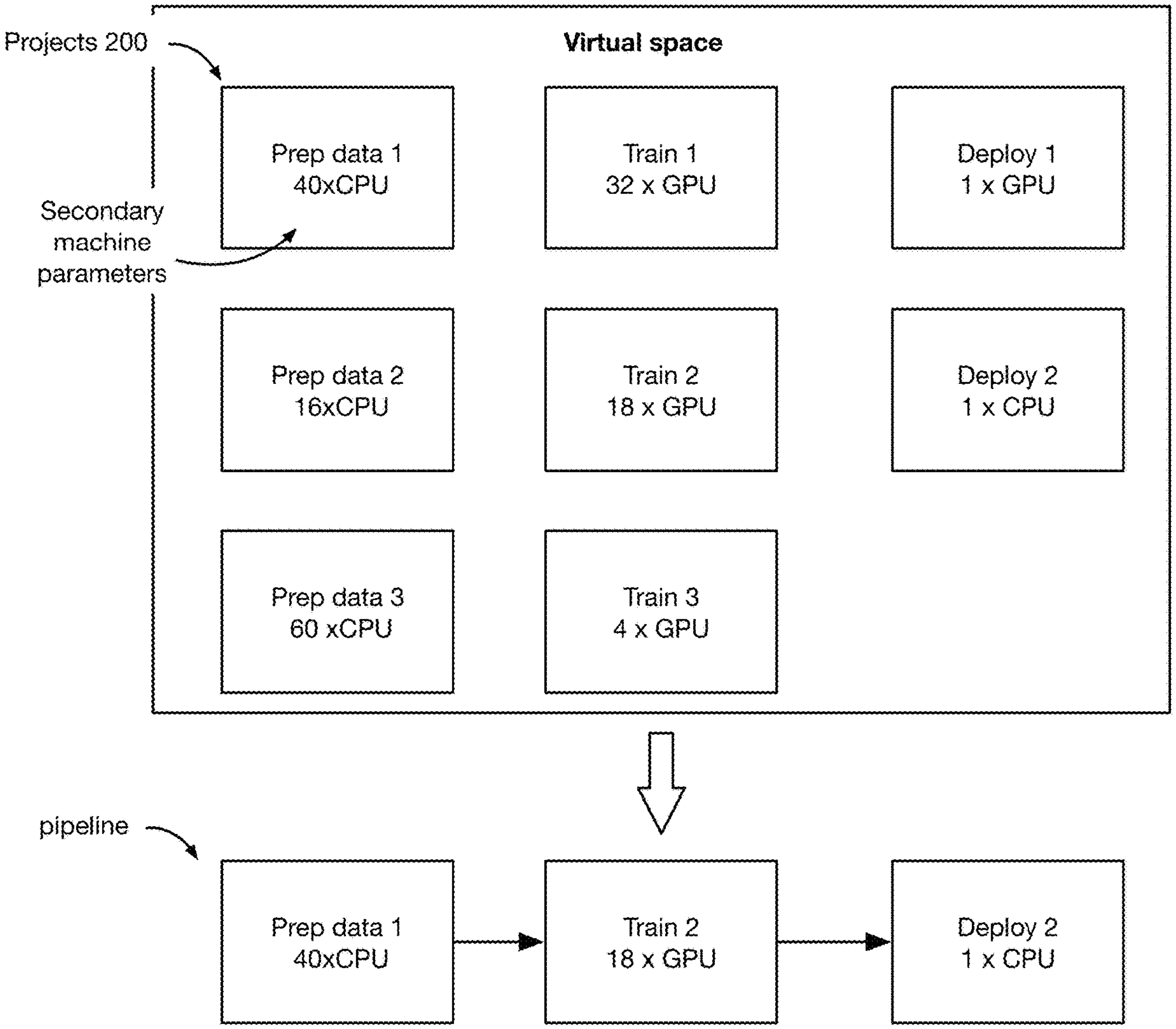
FIG. 14B is an illustrative example of a virtual space with a plurality of projects, which can be composited together into a pipeline.

In examples, the control plane 100 can additionally or alternatively: continue application code execution after interface termination (e.g., web browser closure); automatically shut off idle jobs or environments; enable collaborative coding within the same environment (e.g., by multiple users); enable multiple environments (and the code therein) to be organized into one or more pipelines (e.g., example shown in FIG. 14B); expose an interface to the primary environment (e.g., through a web-based interface, such as a browser or a local IDE that SSHs into the primary device); enable code deployment to be dynamically scaled up or down (e.g., to different numbers and types of hardware); expose an interface to a job or pipeline (e.g., via a URI, an API, etc.); provide plugins (e.g., with prepackaged functionality that can be connected to the environment, code, or datastore; and/or enable other functionalities.

However, the system can be otherwise configured.

2. Technical Advantages

Conventionally, developing machine learning projects is incredibly difficult and slow. First, development is performed locally (e.g., on the user's computer), which has limited memory and computing resources, including both processing power and processor type. Second, even if a user were to initialize a remote cluster of machines for code testing, setting up the machine clusters is a long, multi-step process (e.g., requiring container orchestrator setup, network creation, etc.) that forces the user to halt code development to set up the cluster. Furthermore, the cluster continues to run even when the user is not using said cluster, which incurs costs and occupies unutilized computing resources. Third, the user cannot easily switch between different types of machines using the same code, since the new machines need to be initialized and since the hardware-interfacing lines of code would need to be rewritten to interface with the new machine. Fourth, even if the user were to set up the machines, they would still need to set up the computing environment on a per-machine basis, since the dependencies (e.g., installed libraries, etc.) required by the user's code would still be missing from the new computing environment. Since AI environments are extremely complex, setting up the new computing environments on a machine-by-machine basis not only takes time, but can cause code failures since the reinstalled environment oftentimes is not exactly the same as the original environment, due to package version changes, dependency changes, environmental variable changes, and/or other differences. Fifth, user data and projects are siloed on the user's local machine (e.g., the development machine); other users must download the user's data and/or projects to their local machines to access and/or reference the data and/or projects. Because the size of ML data and projects are incredibly large (e.g., on the order of gigabytes or petabytes), this can be impractical or impossible due to memory constraints or processing constraints.

In variants, this technology can resolve these issues.

First, variants of the technology can provide a virtual, web-based development environment hosted on a remote computing system (e.g., hosted by the platform or on a cloud provider), which enables the user to access more computing resources. In variants, the technology can allow the user to connect a local IDE (interactive development interface) to the remote computing system hosting the development environment (e.g., by SSHing into the remote computing system's device).

Second, variants of the technology can automatically initialize machines in the background (e.g., while the user is developing), without interruption. In examples, in response to user selection of a machine type and number of machines, the platform can automatically access the user's cloud provider account and set up computing environments (e.g., the same as the user's development environment) within the number of machines of the selected type. In examples, this can be done in response to receipt of a single action (e.g., button press).

Third, in variants of the technology, the same environment can be used for coding (e.g., development, debugging, iteration, etc.), training, finetuning, serving, hosting AI applications, deployment (e.g., production), asynchronous jobs, scaling (e.g., to multiple machines, to different machines, etc.), and/or other functions. This enables the developed code to be quickly deployed, since it can be run with no or minimal code changes within the same environment, using the same packages (e.g., package versions), installs, dependencies, environment variables, and/or other environment parameters. In other words, variants of the technology can mitigate failures due to slightly different execution environments. This also enables the code to be scaled to other machines without any additional configuration. Using the same environment for development and for production can also enable rapid machine and computing environment setup. For example, machine and computing environment setup can be in real- or near-real time (e.g., less than 1 minute), even though the machine learning libraries (e.g., needed to set up the environment) are incredibly large. This can be accomplished by using prebuilt machine images (e.g., with container images, module images, dependencies, etc.; sampled periodically during development or at the time of new environment setup; etc.), by cloning the environment, by taking a logical snapshot of the environment (e.g., generating a configuration file with all the packages, environmental variables, and other data, and generating snapshots or images of the installed packages), and/or otherwise accomplished. Alternatively, a user or the system can set a new environment for each new machine or code execution instance.

Fourth, variants of the technology enable the user to dynamically run their code on any type of machine by abstracting away the hardware-specific commands into framework-standard commands (e.g., using the hardware module described in U.S. application Ser. No. 17/741,028 filed 10 May 2022, incorporated herein in its entirety by this reference, and/or other framework, etc.; using TensorFlow; using Pytorch Lightning; etc.), and/or by generating different versions of the code and/or machine images for different operating systems, hardware, and/or computing environments.

Fifth, variants of the technology include a control plane that is connected to all virtual spaces, all supported environments, all datastores, and/or other components. This can enable the technology to connect the supported environments to one or more datastores (e.g., of any size), monitor and manage jobs, automatically shut down jobs, environments, and/or machines when not in use, coordinate between jobs (e.g., using communication channels encrypted using shared credentials, such as TLS, SSL, mTLS certificates, that are installed on the job by the control plane), stream job metadata (e.g., metrics, state, etc.) to an interface provided by the control plane in real- or near-real time (e.g., example shown in FIG. 8B), and/or enable other benefits.

Figure 2:
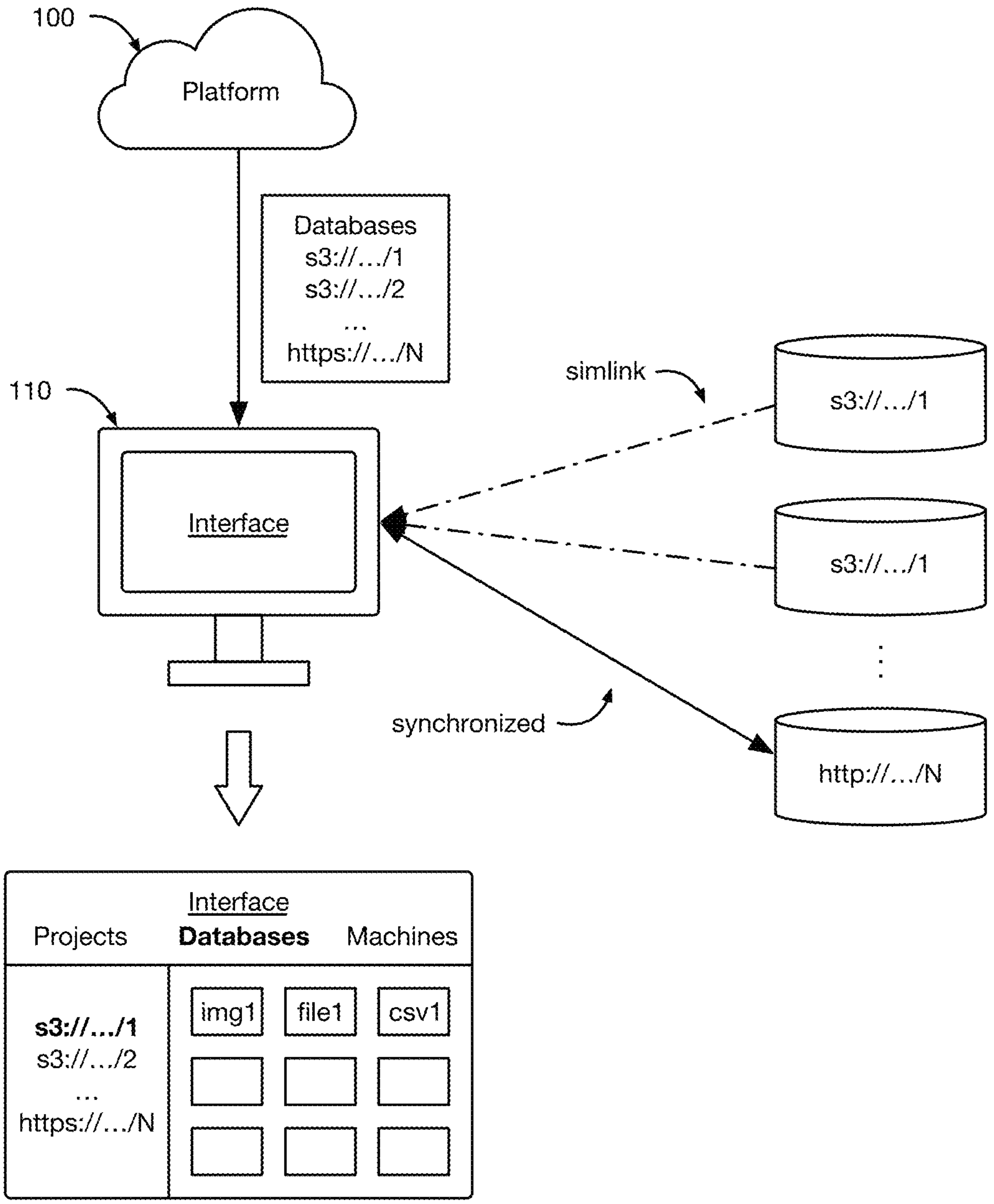
FIG. 2 is a schematic representation of an example of an interface instance connected to a set of databases, and the data that is readable from the interface.
Figure 3:
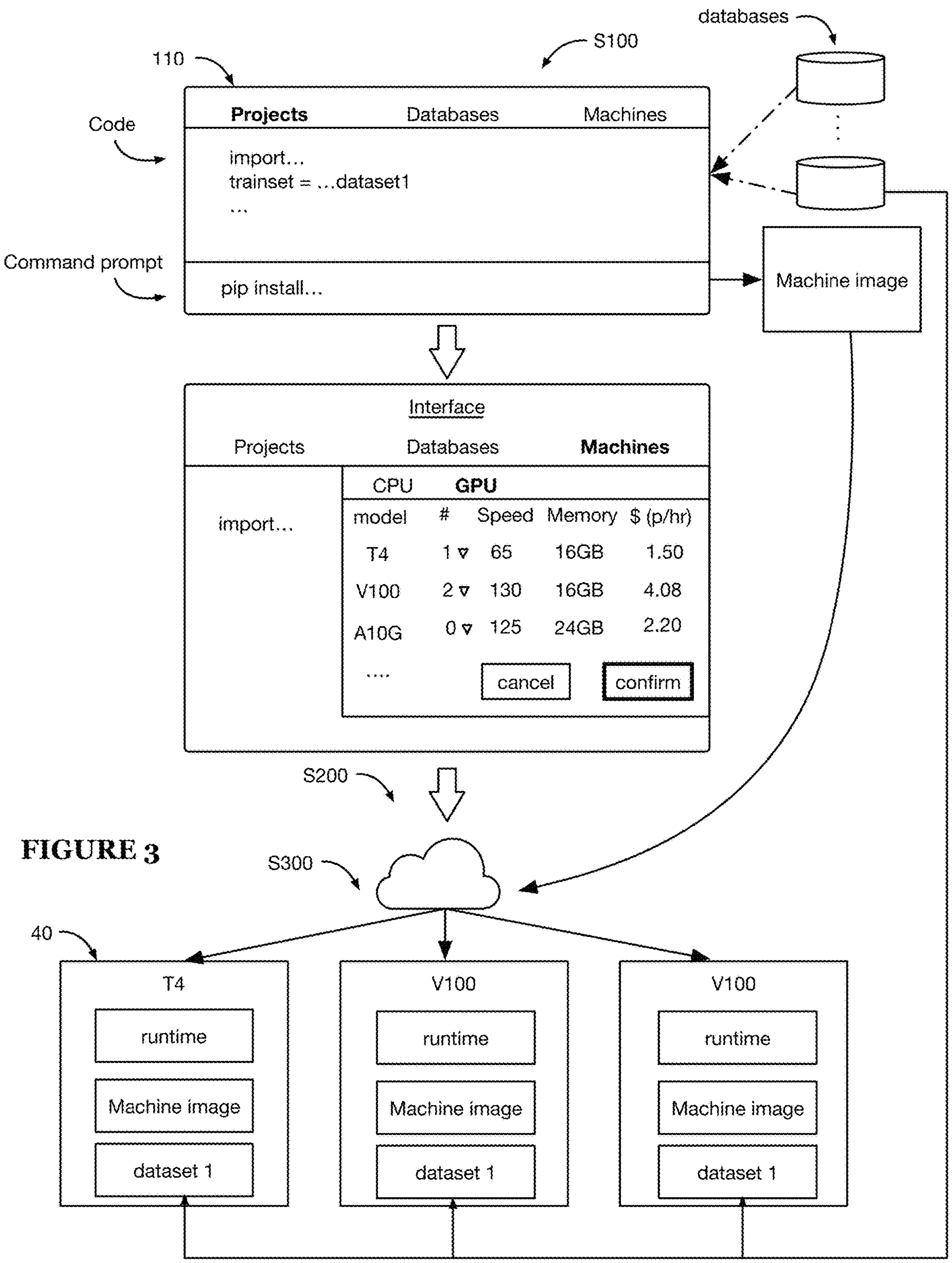
FIG. 3 is a schematic representation of an example of machine selection by the user and machine initialization.

Sixth, variants of the technology enable seamless project and/or data sharing by providing a virtual unified file system. For example, the platform can maintain a list of the datastores (e.g., storing projects, data, etc.) for all or a subset of the platform users, automatically access (e.g., via FTP, SFTP, etc.) and/or mount the datastores to the user's development environment, synchronize the data that the user will edit (e.g., write to), create symbolic links (simlinks) to the remainder of the data in the datastores (e.g., example shown in FIG. 2), and/or otherwise manage the data. The datastores can be network drives, cloud repositories, local drives, snapshots, and/or other datastores. Data referenced by the code can be streamed from the datastore to the machine consuming the code, or otherwise managed. This enables the user to edit their project and reference large amounts of data (e.g., more than their local computing system can store), without needing to download a local copy of the data. This data architecture can further enable the unified file system to be infinitely scalable (e.g., not subject to computer resource constraints). In specific examples, access to the remote computing environments can also be shared. In an illustrative example, a URL specifying the port number, the project identifier, optionally a type of service (e.g., project, flow, work, etc.), and a user domain (e.g., the platform domain) can be shared with other users, wherein the platform can determine an IP address associated with the project identifier (and optionally the type of service), and connect the second user to the port number on the machine identified by the IP address. However, projects, data, and/or computing environments can be otherwise shared.

However, further advantages can be provided by the system and method disclosed herein.

3. System

In variants, the system can include: a platform 100; an interface 11*o*; and a set of virtual spaces, each including a set of projects 200 and a unified file structure, examples shown in FIG. 1 and FIG. 11. However, the system can include any other suitable set of components. The system functions to enable a user to develop machine learning applications (e.g., code) using a cloud-based development environment as if it were on their laptop, and scale the machine learning application with little or no additional manual input (e.g., scale with a single click).

The system can interact with a set of machines (e.g., example shown in FIG. 1), which function to host computing environments and execute programs. The set of machines is preferably remote from the user and distributed, but can additionally or alternatively be local, centralized, and/or otherwise configured. The set of machines can be provided by the platform entity, a set of cloud providers (e.g., AWS™, Google Cloud™, Azure™, etc.), by the user, and/or otherwise provided. The machines can be of the same or different type. Examples of machines that can be used with the system can include: GPUs, CPUs, TPUs, IPUs, and/or other processing units; memory (e.g., flash, RAM, etc.), network connections, and/or other components. In examples, the machines can be on-demand instances, reserved instances, spot instances (e.g., interruptible instances), and/or other instances.

In variants, a user can provide the platform with access to their cloud provider account, which enables the platform to control the machines (e.g., start up, shut down, etc.) via the user's account. In a first variant, the user can provide an access token (e.g., API token, etc.) or credentials (e.g., username, password, etc.) to the platform (e.g., by generating an access token on the cloud provider's interface, then providing the access token to the platform). In a second variant, the platform can automatically obtain access. In an example, the user can access the cloud provider via a special URL or a special URL appendix, wherein the special URL or appendix can cause the cloud provider to reference a setup template (e.g., stored by the cloud provider or another datastore, using CloudFormation, etc.), wherein the setup template can be run in response to user acceptance (e.g., indicated by a user action, a single user action, etc.). Running the setup template can automatically: create a security group for the user, create a subnet for the user, add any machines controlled by the platform on the user's behalf to the security group and/or subnet, provide the platform with the cloud provider role, identifier, and authorization, and/or perform any other suitable set of actions. The platform can subsequently store the role, identifier, authorization, and/or any other suitable information in association with the user account. However, the platform access to the cloud provider's user account can be otherwise provided.

Figure 7A:
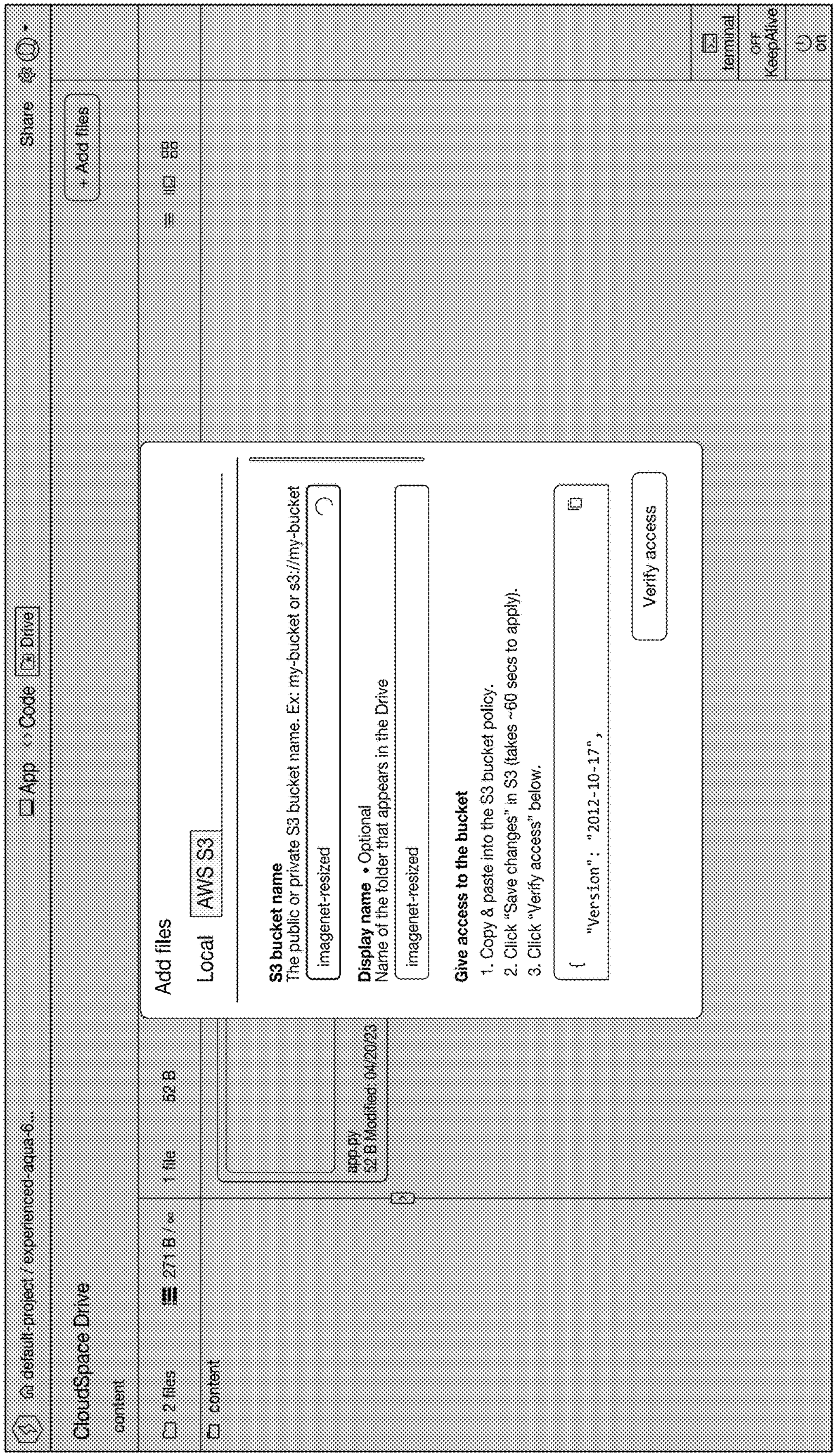
FIG. 7A is an illustrative example of connecting a database to the project, including code to give the platform access to the database.
Figure 7B:
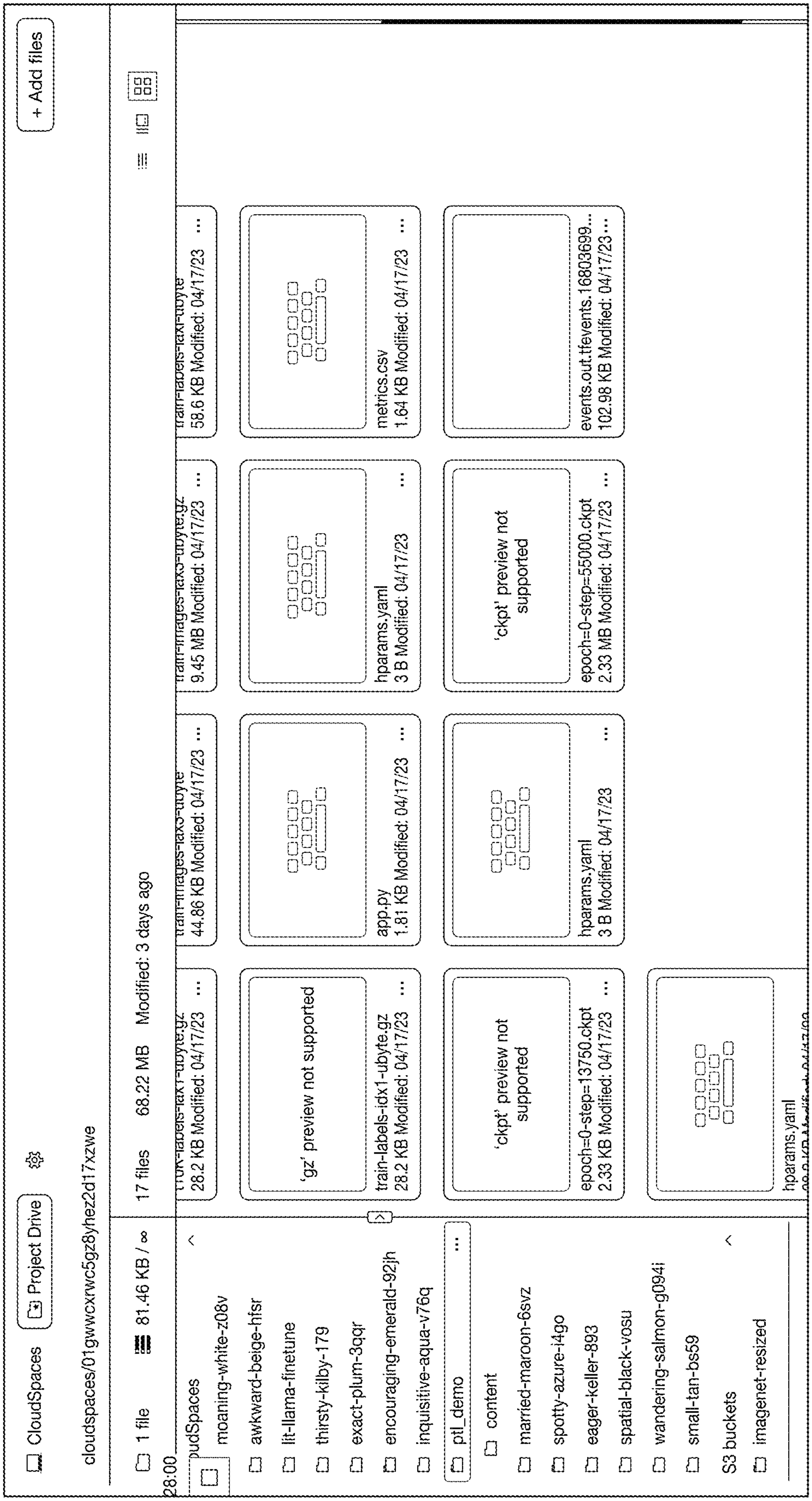
FIG. 7B is an illustrative example of the unified file structure and the data that is accessible to the user through the system.

The system can interact with a set of databases (e.g., examples shown in FIG. 1, FIG. 2, FIG. 3, FIG. 7A, and FIG. 7B), which function to store programs, machine learning data (e.g., training data, test data, etc.), and/or other data. The set of databases is preferably remote from the user and distributed, but can additionally or alternatively be local, centralized, and/or otherwise configured. The databases can be provided by the platform, cloud providers, the users (e.g., local databases), third parties (e.g., accessible as a downloadable, via an API, etc.), and/or by any other suitable entity. The databases can be public databases (e.g., shared with all users), private databases (e.g., shared with a subset of the users), and/or have other access permissions. The data within the databases can be provided by users (e.g., a by providing access to a pre-existing database, example shown in FIG. 7A; by uploading data; etc.; example shown in FIGURE SA), scraped from publicly available databases, and/or otherwise provided. The databases (and/or folders or files within the databases) can be accessed via filepaths, URLs, and/or any other suitable identifier. In variants, the platform can maintain a list, table, or other repository of the database identifiers, which can be used to surface the data within the databases to users.

The system can interact with one or more database sets, wherein each database set can be associated with a different virtual space. Databases can be connected to multiple virtual spaces; alternatively, the databases can be connected to a single virtual space.

In a first variant, the system can include a unified file structure that enables projects 200 within the virtual space to access the set of databases associated with the virtual space. In a second variant, the system can copy, clone, or otherwise replicate the data from the set of databases into system storage. In a third variant, the system can directly connect to the set of databases, using client applications (e.g., provided by the databases), using a database interaction library, via an API, or otherwise connecting to the set of databases.

Figure 4A:
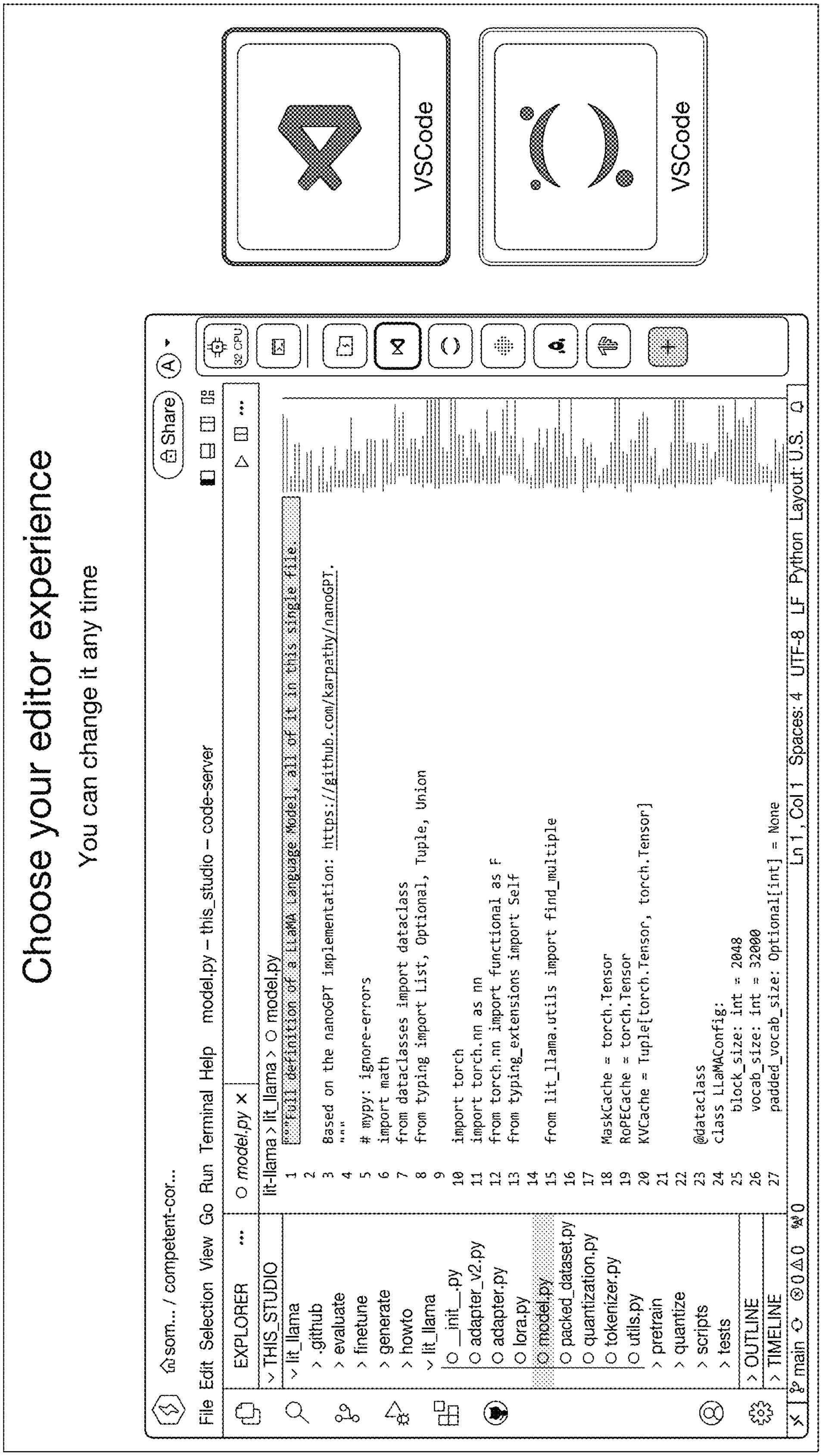
FIG. 4A is an illustrative example of an example of the interface and editor options.
Figure 4B:
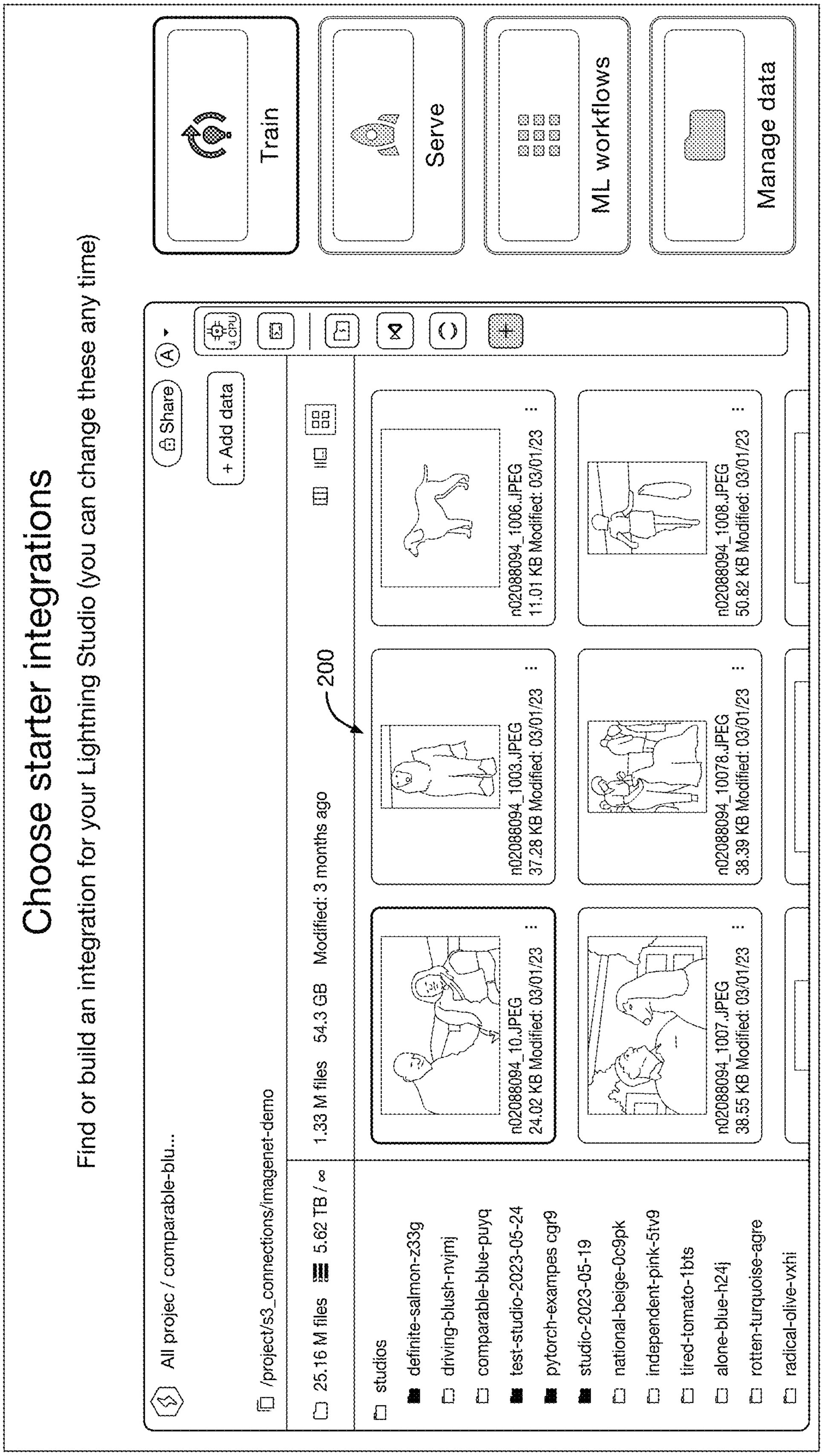
FIG. 4B is an illustrative example of an example of applications that can be connected to the system.
Figure 5A:
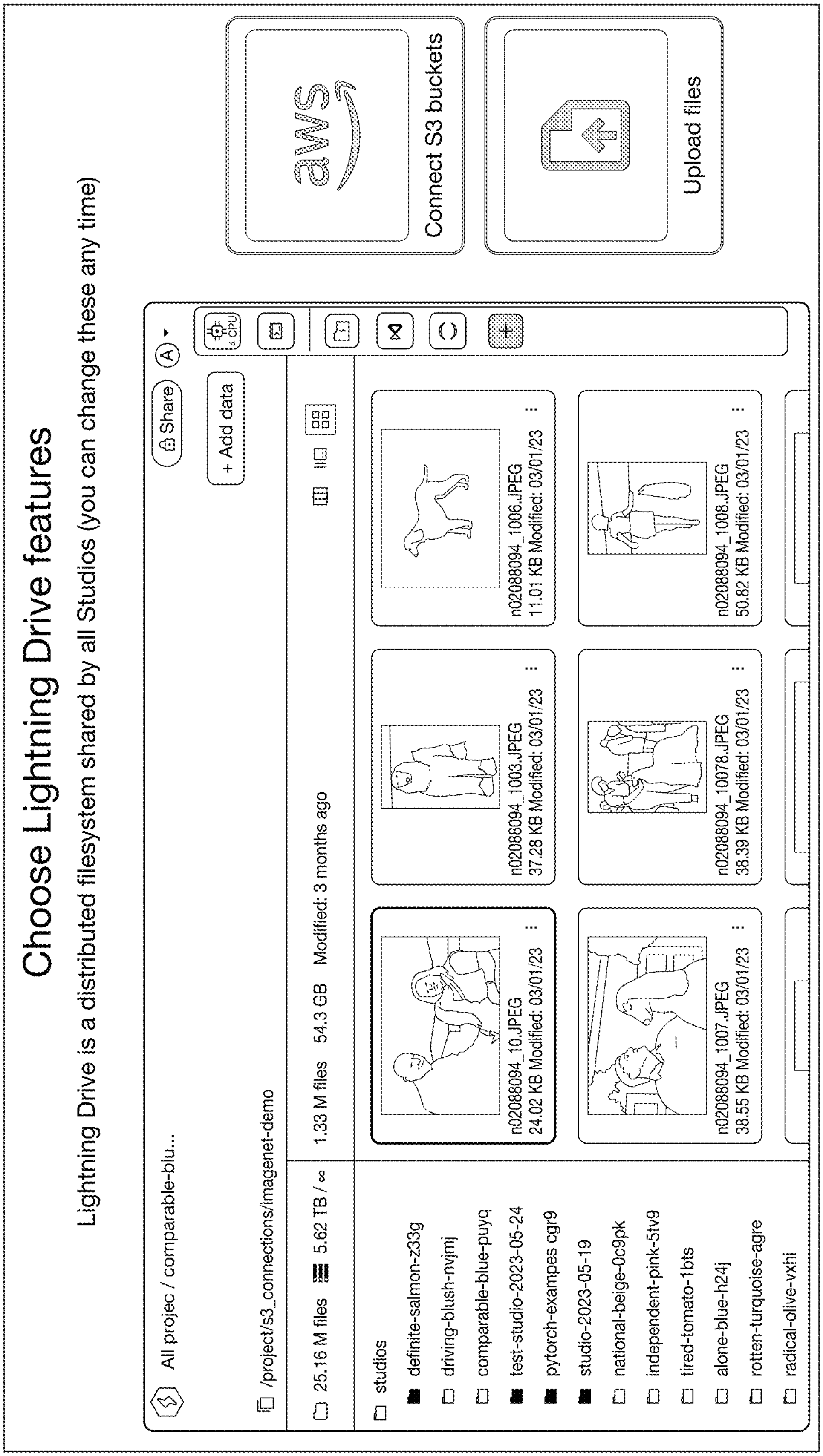
FIG. 5A is an illustrative example of an example of connecting databases to the system.
Figure 5B:
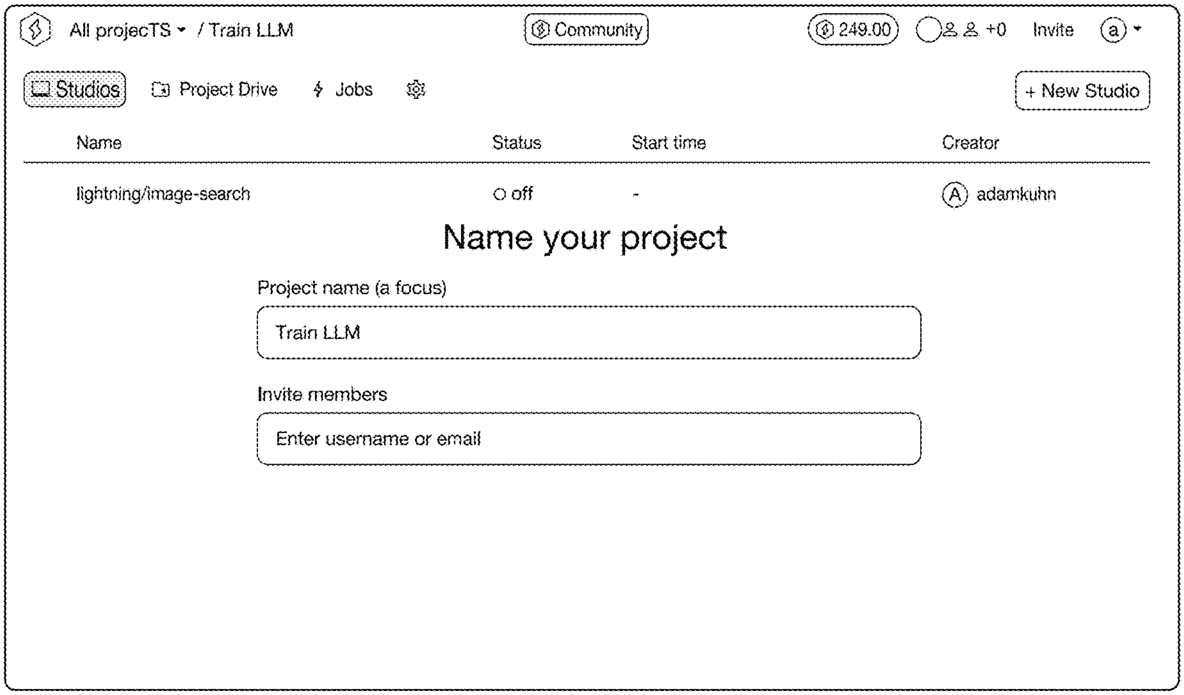
FIG. 5B is an illustrative example of an example of initializing a project.
Figure 6A:
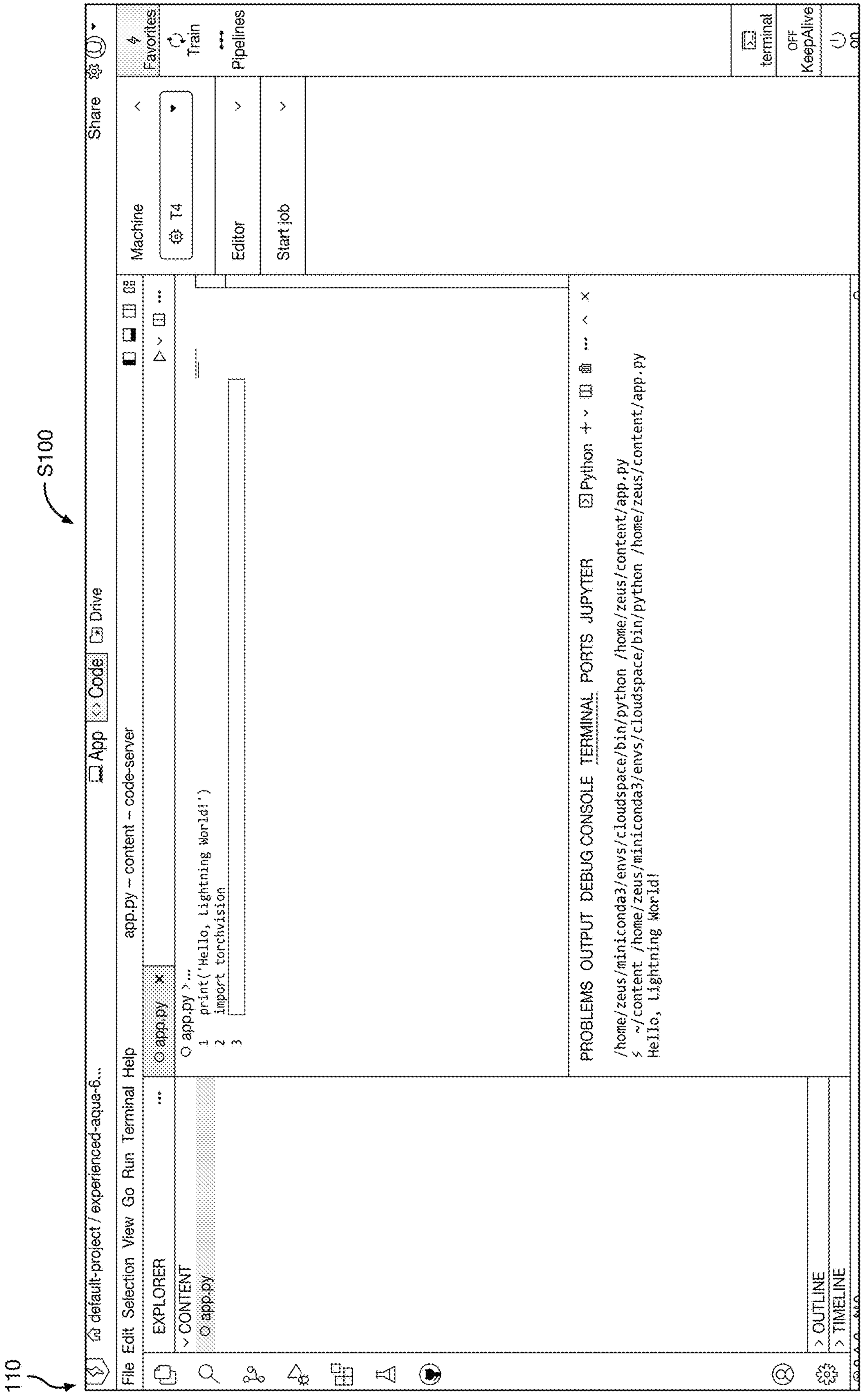
FIGS. 6A and 6B are illustrative examples of selecting a set of machines for training and/or execution.
Figure 6B:
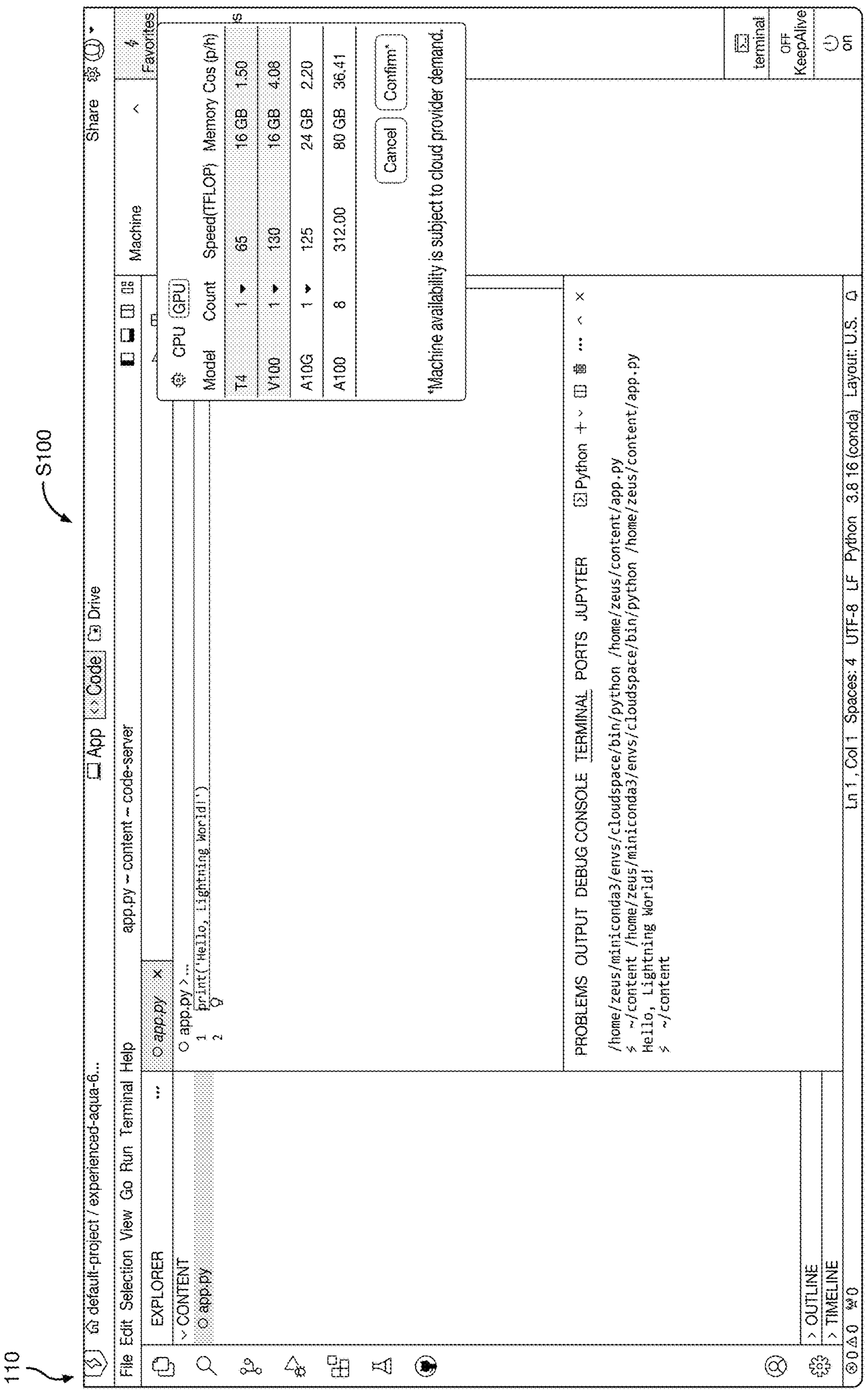
Figure 8A:
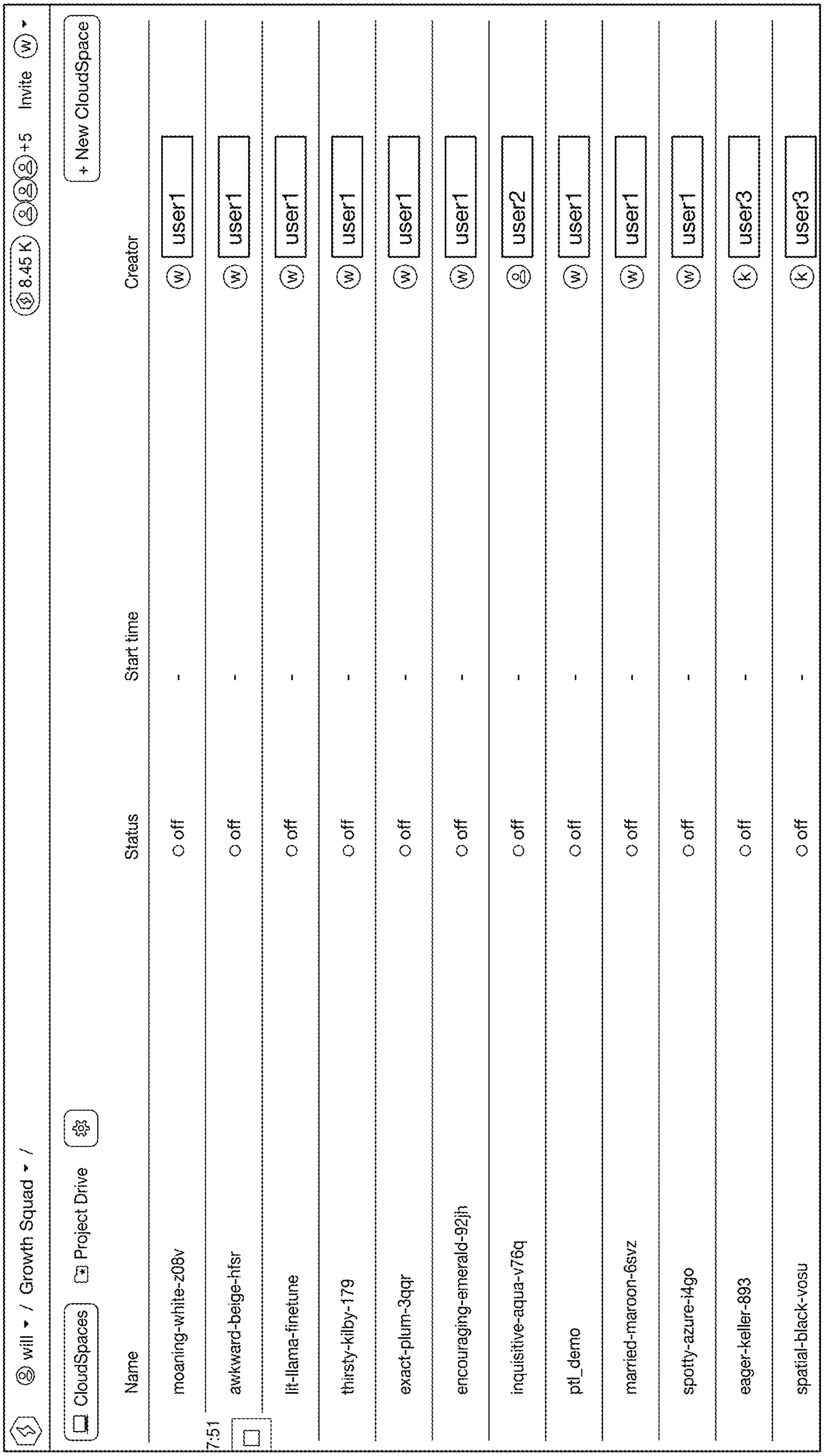
FIG. 8A is an illustrative example of the projects that are accessible to the user through the system.
Figure 8B:
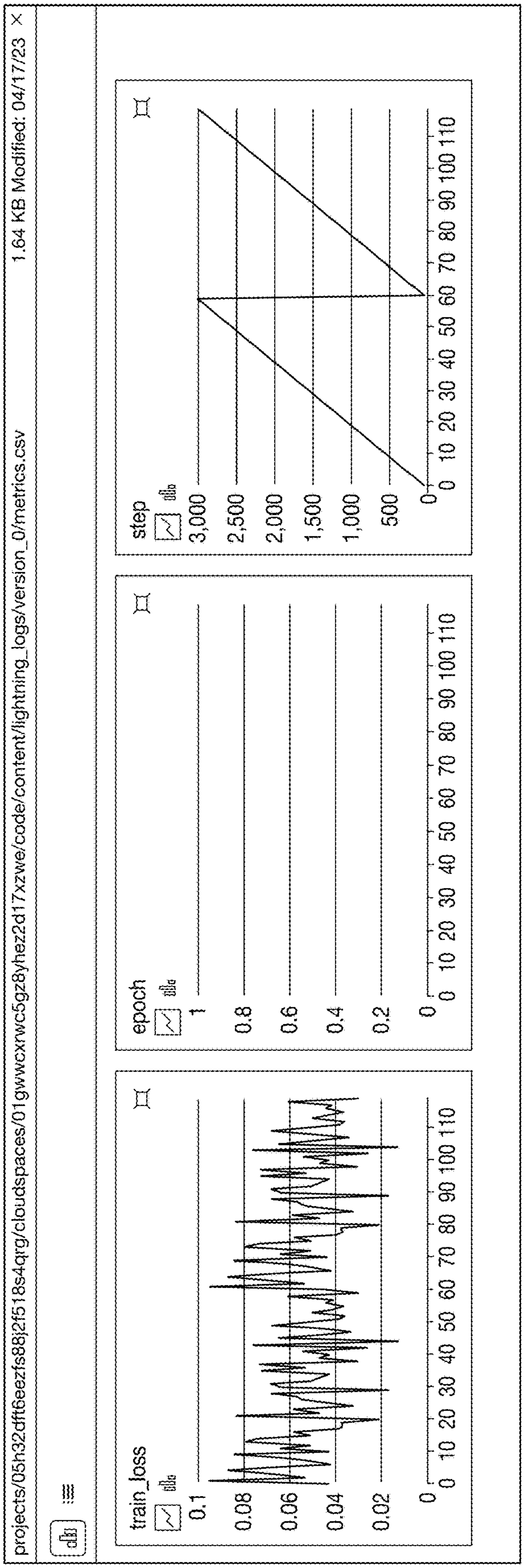
FIG. 8B is an illustrative example of an output of an application executing on data accessible via the unified file structure.

The system can additionally or alternatively be used with a set of plugins or applications, which function to transform the data accessible via the unified file system (e.g., examples shown in FIG. 4B and FIG. 8B). The plugins or applications can execute locally, remotely (e.g., in a remote machine, across a set of remote machines, etc.), and/or in any other suitable machine. The plugin can be installed within the environment, execute alongside the code, execute alongside the environment, execute alongside the project (e.g., within a separate container; have access to the shared datastore) on the same machine, be a separate job (e.g., running in a separate environment, on the same or different machine), and/or be otherwise configured. In an example, when a user installs the plugin on a virtual space, the system can initialize a separate container, executing in the same or different environment, that is running a separate application (e.g., the plugin), wherein the container is connected to the shared datastore and optionally the originating environment or virtual space. However, the plugin can be otherwise installed and/or run.

The plugins or applications can be authored by the platform, by a third party, and/or by any other suitable entity. Examples of plugins that can be used include: visualizations (e.g., experiment visualizations, etc.), hyperparameter sweeps, distributed computing, train on multi-node, host Streamlit™ applications, process datasets in parallel, host and deploy web applications, monitor models, and/or packages that perform any other machine learning infrastructure functionality.

In a first variant, the plugin can include or be a package. In a second variant, the plugin can include its own environment and code, and be connected to the virtual space when installed by a user. In a third variant, the plugins or applications can be the applications described in U.S. application Ser. No. 18/141,632 filed 1 May 2023 which is incorporated herein in its entirety by this reference, or be any other suitable application. In an example, when a user runs an application (e.g., via the interface) on a dataset (e.g., from the unified file system), the platform can automatically initialize a set of machines (e.g., specified by the application), stream the data from the referenced dataset to the machine(s), and execute the works and/or flows specified by the application using the data. In examples, this can be done without downloading the application or data to the local machine, without executing works on the local machine, and/or without executing the flow logic on the machine.

However, the system can be used with any other suitable systems and/or components.

The platform 100 (control plane) of the system can function to: provide the interfaces, orchestrate machine operation (e.g., initialization, teardown, etc.), track machines for each user, orchestrate job execution (e.g., initializing the environments, controlling code execution, etc.), monitor job execution, track projects for each user, track datastores for each user, store user preferences, and/or provide other functionalities (e.g., example shown in FIG. 1).

The system preferably includes a single platform (e.g., shared by multiple virtual spaces, shared by multiple users, etc.), but can alternatively include multiple platforms.

Figure 9:
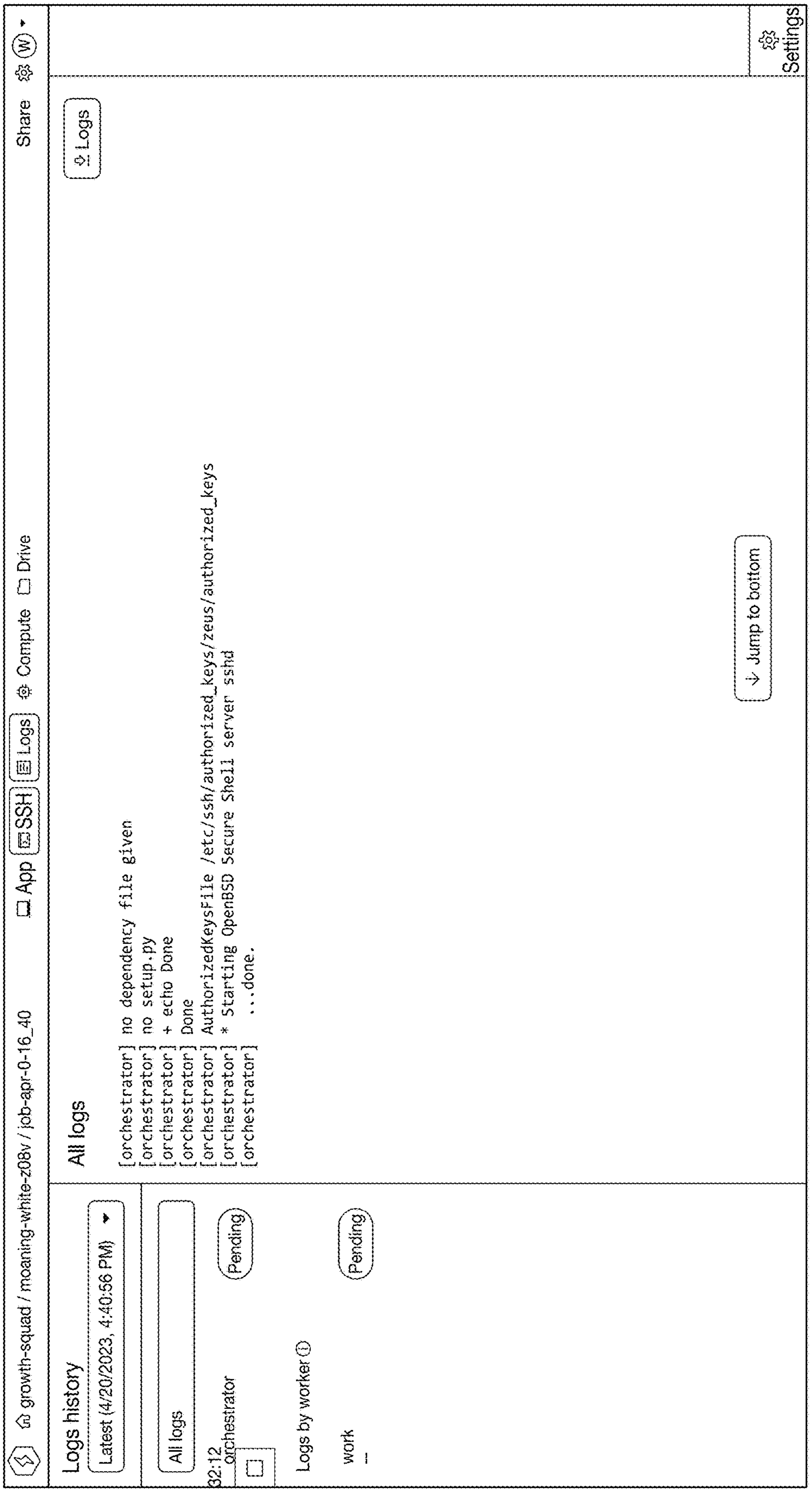
FIG. 9 is an illustrative example of the data logs generated by running the user-developed code on one or more machines.
Figure 10:
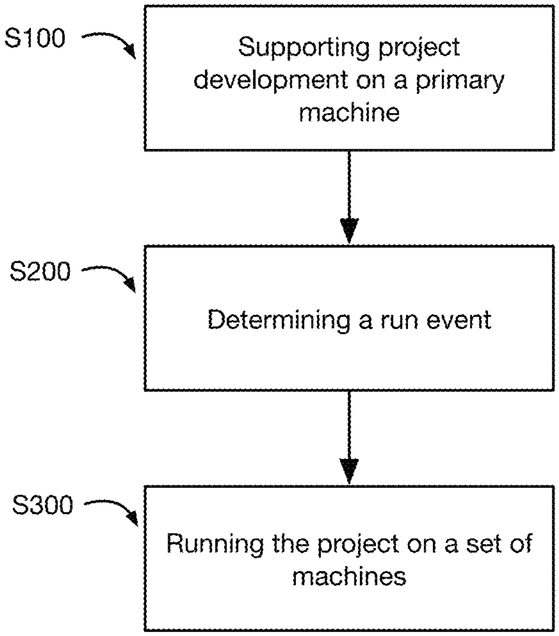
FIG. 10 is a schematic representation of a variant of the method.

The interface **11*o* of the platform 100 can function to provide the user with an interface for code development, machine monitoring, job monitoring (e.g., example shown in FIG. 9), and/or other project interactions. The interface is preferably web-based (e.g., hosted on the platform or on a remote machine and exposed to the user via a browser or browser-based application), but can alternatively execute natively on the user's local system. The interface is preferably an interactive development environment (IDE), but can alternatively be any other development interface, be a webpage, be an API, and/or be any other suitable interface. The interface can support multiple different types of IDEs (e.g., Visual Studio, Pydev, etc.), or include a single IDE. The user can specify interface settings (e.g., display mode, annotation mode, etc.), which can be persisted across sessions, or not be able to specify interface settings. Additionally or alternatively, the interface can be a local interface (e.g., on the user's computer), wherein the local interface can SSH into or otherwise access the primary machine 30 running the development instance of the project. The interface preferably has similar features and layout to a terminal, code editor, IDE, or other editor (e.g., example shown in FIG. 4**A), with options to edit code, browse datastores, run the code, dynamically initialize or shut down remote machines, and/or other functionalities. For example, the interface can use the same commands as an IDE (e.g., the same shortcuts, keybindings, etc.). Alternatively, the interface can have a different look and feel. The interface can be accessed through: a web browser, a native application (e.g., web-based application), a local program, and/or any otherwise accessed. In variants, interface settings (e.g., IDE settings) can also be persisted for an environment, project, or virtual space, or are not persisted. However, the interface can be otherwise configured.

The platform 100 can support one or more virtual spaces (e.g., teamspaces). The virtual spaces can be used by a user to develop one or more projects (e.g., examples shown in FIG. 3, FIG. 5B, FIG. 6A, FIG. 6B, FIG. 8A, FIG. 11, and FIG. 14B). The platform preferably has access to projects, filesystems, datastores, and/or other components of a virtual space; alternatively, the platform can have limited or no access to one or more components of a virtual space.

Each virtual space can support one or more projects 200, a shared datastore (e.g., one or more databases unified by a unified file system), shared models (e.g., machine learning models), and/or other components. The virtual space can additionally or alternatively be associated with: one or more user accounts (e.g., to enable collaborative coding or development), permissions (e.g., for different environments, plugins, etc.), cloud storage credentials, default settings (e.g., development machine default, production machine default, etc.), and/or other information. Each virtual space can be associated with one or more machines from one or more providers.

In a first example, the virtual space can store a list of all databases (e.g., database references) that have been connected to the platform (e.g., connected to a project developed using the platform), and optionally expose the databases to the environments and/or user via a unified file system, example shown in FIG. 1.

In a second example, the virtual space can store a routing table associating the user identifier, system identifier, and/or project identifier, and optionally a service type (e.g., a flow service, such as that from U.S. application Ser. No. 18/141,632; a work service, such as that from U.S. application Ser. No. 18/141,632; a project; etc.), with an IP address or other machine identifier (e.g., that is executing the service), example shown in FIG. 1. In a variant of this example, the platform can optionally receive a request identifying the user or project identifier and optionally identifying the service type, wherein the platform can automatically provide a connection (and/or connection information) to the IP address of the machine associated with the identifier (and optionally service type). The request can be a URL, API call, and/or other request. This can be used to share access to programs, machines, and/or computing environments with other users. In an illustrative example, the platform can receive a request to 500-x123-studios.lightning.ai/root.as, wherein "500" is a port number, "x123" is the user identifier, "studios" indicates the service type ("studios", or projects), "lightning.ai" is the platform domain, and "root.as" is the project name. In response to receiving a call to this URL, the platform can look up the IP address of the machine running the "root.as" project for the "x123" user, and provide access to the 500 port of the identified machine (e.g., after requestor authorization). Other types of services that can be referenced can include works (e.g., discussed in U.S. application Ser. No. 18/141,632, etc.); flows (e.g., discussed in U.S. application Ser. No. 18/141,632, etc.), such; and/or any other suitable service.

In a third example, the virtual space can store cloud provider access credentials for each user.

In a fourth example, the virtual space can obtain, generate, and/or store access certificates (e.g., TLS certificates, SSL certificates, etc.) for machine access and/or communication. The virtual space can store a single access certificate for all users, a different access certificate for: each user, each service, each machine, and/or any other suitable number of access certificates.

In a fifth example, the virtual space or platform can store a list of external interfaces in association with a set of projects or instances thereof (e.g., example shown in FIG. 11). Examples of access points can include: universal resource identifiers (URI) associated with web interfaces, application programming interfaces (APIs), and/or other interfaces. The user interfaces can be associated with: a project (e.g., code and an environment), a checkpoint in a project (e.g., a checkpoint in the code, wherein the checkpoint is published instead of the entire code or project), a job (e.g., instance of a project executing on a predetermined number of a predetermined machine type, etc.), and/or other project or instance thereof. In a first example, the virtual space (or control plane) can include a list of URIs, each associated with a different project (e.g., from the same or different virtual space). In this example, when a URI in the list is accessed by a third party, the platform can connect the third party's computer (e.g., browser) to a currently-executing instance of the project, or initialize a machine, initialize the project on the machine, and connect the third party's computer to the newly-initialized project instance. In a second example, the virtual space (or control plane) can automatically generate an API to each of a set of functions or checkpoints in the project code, wherein calling the API can send the request to execute the respective function or begin code execution at the respective checkpoint on a currently-executing instance of the project, or can trigger new project instance initialization, wherein the request is sent to the newly-initialized project instance. However, the list of user interfaces can be otherwise used.

In a sixth example, the virtual space can store one or more models provided by the user. The model can be uploaded (e.g., by uploading a checkpoint file; by dragging and dropping the checkpoint file into a browser-based IDE; using a command line interface; etc.), by importing the model from a code repository (e.g., github, gitlab), and/or otherwise storing the models.

However, the virtual space can store any other suitable information.

The datastore of the virtual space functions to provide a shared data repository for projects to write and/or read data to and/or from, respectively. For example, the datastore can store: training data, inputs, outputs, artifacts (e.g., models, machine learning weights, equations, etc.), logs, embeddings, hyperparamters, and/or other data. Each virtual space preferably includes a single datastore, but can alternatively include multiple datastores. The datastore can be formed from a single database (e.g., hosted by the platform or by a third party storage provider), multiple different databases (e.g., hosted by the platform, by a third party storage provider, or by multiple third party storage providers), and/or be otherwise constructed. When the datastore is formed from multiple different databases, the databases can be presented as a unified filesystem by the unified file structure, be presented as disparate databases (e.g., with disparate filesystems), and/or be otherwise presented to the rest of the virtual space.

The unified file structure of the virtual space can function to share projects and/or data between users. In variants, the unified file structure enables large amounts of data (e.g., petabytes of data) to be instantaneously and/or near-instantaneously shared between users while bypassing the space constraints of local machines (e.g., that the user is using to access the interface and/or develop the program). In a first example, this can be accomplished by merging the file structures of each database within the shared datastore. In a second example, this can be accomplished by mounting all databases (e.g., public databases) to a user's development environment, synchronizing (e.g., copying to local storage) the data or databases to be edited or written to, and creating simlinks (symbolic links) to all or a subset of the remainder of the data in the datastores (e.g., example shown in FIG. 2). This enables the user to reference (e.g., read) the other data without writing said data to disk, while retaining write access to the synchronized data (e.g., reference more data than their local machine has storage for; example shown in FIG. 7B). In variants, the synchronized data can be stored or synchronized to a new database (e.g., associated with the user), which can be registered with the unified file structure. This copy of the data can be treated as a new version of the data and can also be accessible to other users via the unified file system. In an illustrative example, all databases (e.g., public databases) can be mounted to a temporary local repository, the user can specify which database they want to download to local storage (e.g., synchronize, mirror, etc.), and the user can optionally specify which databases they want read access to (e.g., create simlinks to). However, the unified file structure can be otherwise determined and/or used.

The projects 200 ("Studios") of the virtual space function as microservices, self-contained tasks, and/or perform any other functionality. Each project preferably enables a single machine learning task (e.g., endpoint, finetuning workflow, training workflow, inference workflow, etc.), but can alternatively represent multiple machine learning tasks and/or any other number of other types of tasks. In variants where a project represents a single machine learning task (e.g., examples shown in FIG. 14A and FIG. 14B), different projects can be pipelined together and/or reused in different pipelines (e.g., example shown in FIG. 14B). In an example, the pipelines can be represented as a graph (e.g., a directed acyclic graph), where each node represents a project. In this example, each node in the DAG can access files from other nodes in the DAG, and perform arbitrarily complex tasks. This can be further enabled by using the virtual space datastore as a shared datastore for project outputs and/or inputs; projects (e.g., preceding projects) can write their outputs to the shared datastore, and other projects (e.g., successive projects) within the pipeline can read the outputs from the shared datastore and utilize those outputs as inputs to their task. In further examples, since each task is self-contained within a project (e.g., with its own environment, etc.), this allows the user to install custom CUDA versions, use different Python versions, different datasets, and otherwise use different environments (e.g., dependencies, packages, etc.) for each task. This can enable the project to be highly customized to the task, and utilize the best environment for the given task without infecting the rest of the pipeline with requirements bespoke to that particular task.

Each project 200 is preferably created by a user, but can alternatively be copied from another project, or otherwise created. For example, a virtual space can include both projects that were authored by the user and that were copied from another user. All or a subset of the projects developed by the users can be stored on the databases and/or accessible to other users; alternatively, the projects can be private to the user.

Figure 12:
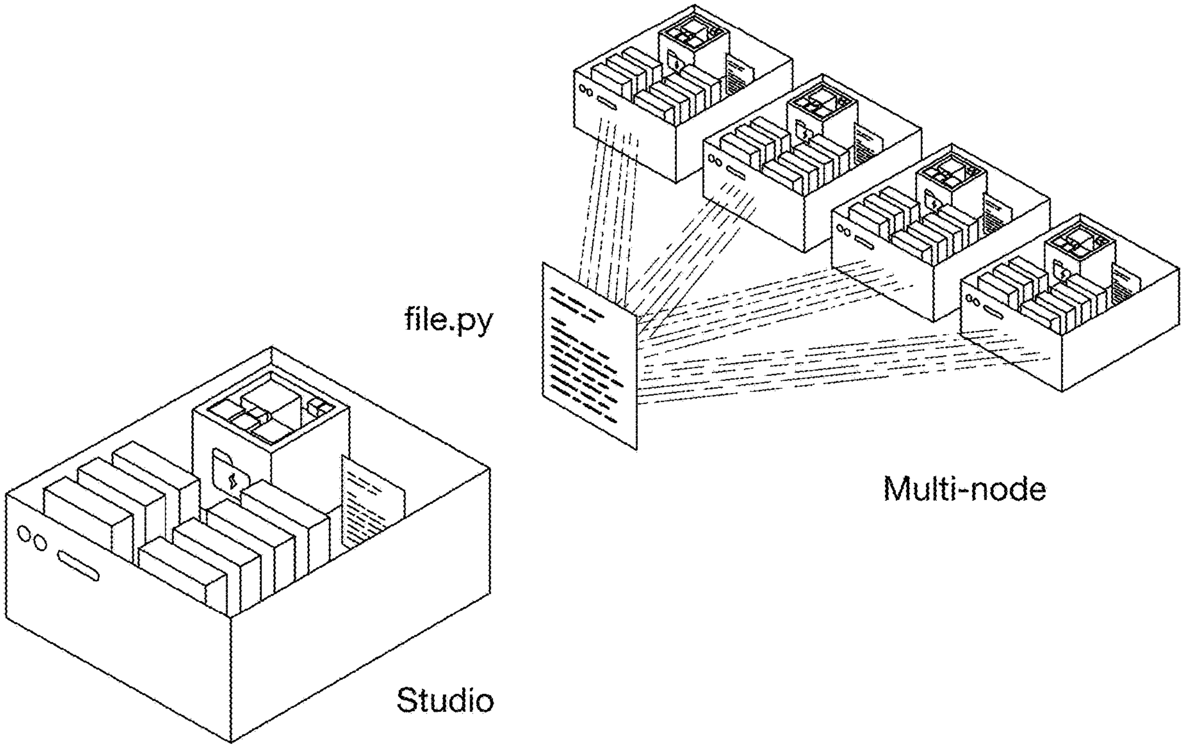
FIG. 12 is an illustrative example of running the project on multiple nodes.

All or portions of a project 200 can be executed on a remote machine (e.g., on a computing environment different from the development environment), on the local machine (e.g., the remote computing system hosting the development environment; on a user's device; etc.), or otherwise executed. In a first example, each project within a virtual space or pipeline runs on a different machine (e.g., physical machine, virtual machine, etc.). In a second example, multiple projects run on the same machine (e.g., physical machine, virtual machine, etc.). In this example, each project can run in its own container, but can alternatively share containers. In an illustrative example, a data preparation project can be run using 40 CPUs to parallelize the task; model training (the next task in the pipeline) can be run using 32 GPUs; and serving a model (the final task) can be run using a single GPU. In a third example, a project can be executed by a cluster or set of machines (e.g., for tasks that exceed the capabilities of a single machine); example shown in FIG. 12. In this example, the control plane or another process can coordinate between the multiple nodes within the cluster. However, the project can be executed by any other set of machines.

Each project 200 preferably has access to the shared datastore associated with the virtual space, but can alternatively have access to a subset of the shared datastore, access auxiliary datastores outside of the shared datastore, and/or access any other suitable set of data.

Each project 200 can include: code 240, an environment 220 (e.g., computing environment, runtime environment), and/or other components; example shown in FIG. 11. Each project preferably includes a single environment and a code set, but can additionally or alternatively include multiple environments, no code, and/or be otherwise configured. The environment for different projects is preferably different, but can alternatively be the same.

Each project 200 is preferably persisted by the platform (e.g., across sessions, runs, when switching machines, etc.), but can alternatively be transient and not persisted by the platform. The project can be persisted in the virtual space's shared datastore (e.g., a cloud provider via a user account, etc.), in a separate datastore, on the primary machines 30, and/or otherwise persisted. In variants, the platform can persist the project environment, code, state (e.g., execution variable values, model weights, etc.), and/or other information.

In a first example, the platform 200 can persist an instance of the environment and code on a reserved machine, wherein the machine is left on, wherein the machine memory is not cleared, and/or the machine is otherwise reserved for the project. In a second example, the platform can store the environment (e.g., as discussed below) and store the code in persistent platform storage, then shut down the machine when the session has ended (e.g., the browser is closed, the code has stopped running, a timeout condition is met, etc.). In a third example, the platform can persist the environment, and retrieve (e.g., sync) the code from a third party database (e.g., github, gitlab, etc.) connected to the environment. However, the project can be otherwise persisted. In variants, persisting the project (e.g., including the code and environment) can enable the project to be serverless, enable the project to be published to other users, enable the project to be duplicated by other users, to be scaled easily, and/or confer other benefits.

Each project 200 can include an environment 220 (e.g., runtime environment, etc.), which functions to provide the software infrastructure that enables code execution. The environment can include: installed packages, libraries, binaries, frameworks, environment variables and/or settings (e.g., data or storage identifiers, network configurations, API keys, access tokens, feature flags, user preferences, file paths, system configurations, etc.), images (e.g., of packages, libraries, other software, etc.), references to data (e.g., training data, test data, etc.; wherein the references can be within the code, associated with the project, etc.), dependencies (e.g., libraries that the code references; installed in the computing environment that the code executes within; etc.), and/or other data. The environment can optionally also include the machine specifications (e.g., number of machines, types of machines, etc.), the cluster specifications, and/or other specifications. The environment preferably runs on a machine and does not include the machine itself, but can alternatively include the machine. In variants, the environment can be contained in a container or other self-contained package. In variants, each environment in a virtual space or on the platform can be isolated from each other (e.g., cannot read and/or write directly with each other; do not share dependencies; etc.), indirectly connected to each other (e.g., via a shared datastore, by an orchestrator environment, etc.), or directly connected to each other.

Furthermore, the environment can be persistent (e.g., stored between sessions), portable (e.g., across hardware types), be cloud-based, and/or have any other set of characteristics.

The environment 220 is preferably persisted by the platform (e.g., across sessions), but can alternatively be transient and not persisted by the platform. In a first example, the platform can persist the environment on a reserved machine (e.g., machine that is left running or is reserved for the environment or associated project). In a second example, the platform can capture and store a snapshot of the environment, wherein the snapshot is mounted to reinitialize the environment. In a third example, the platform can capture and store a logical snapshot of the environment. In a specific example, the logical snapshot can include a configuration file of the environment (e.g., including a list of the packages, dependencies, environmental variables, etc.), along with a set of images or snapshots of the packages, wherein the package images are mounted to reinitialize the environment. In a fourth example, the platform can store a configuration file for the environment, wherein packages identified in the configuration file can be retrieved (e.g., from a third party package source) and installed to reinitialize the environment. In these examples, the configuration file can optionally specify an order for package installation, which, in some cases, can substantially speed up environment reinitialization.

In variants, persisting the environment can enable the project to be serverless (e.g., not be constantly running on a machine), especially when the control plane monitors for the URI request or is the resource identified by the URI. In an illustrative example, a user can deploy a model API associated with a project, and configure the project to be serverless. Whenever a model API request is received (e.g., by the control plane), the control plane can initialize an instance of the project and render the webpage for the model. After the project instance is used, the project can optionally be saved (e.g., the virtual space can store the state), and the project instance can be shut down. However, environment persistence can enable any other suitable set of functionalities.

The code 240 within a project 200 function to define the project task, define a workflow, architecture, program, or include another set of instructions. Each project preferably includes a single code set, but can alternatively include multiple code sets. The code is preferably written by a user, but can alternatively be copied from a code source, inferred by a machine learning model, and/or otherwise determined. In a first example, the code can be written by the user within the interface (e.g., within a browser-based IDE). In a second example, the code can be imported from a code repository (e.g., Gitlab, Github, etc.). However, the code can be otherwise determined. In examples, the code can be written in or leverage one or more development frameworks, which can abstract away code-hardware interfaces, coordinate jobs across distributed computing systems, and/or perform other functionalities. Examples of frameworks that can be used include PyTorch Lightning, HuggingFace, TensorFlow, the frameworks described in U.S. application Ser. No. 17/741,028 filed 10 May 2022 which is incorporated herein in its entirety by this reference, the frameworks described in U.S. application Ser. No. 18/141,632 filed 1 May 2023 which is incorporated herein in its entirety by this reference, and/or other frameworks.

All or portions of the code 240 can be executed when the code is run. In a first example, all of the code is run in response to a run request. In a second example, only a portion of the code (e.g., portion after a checkpoint, portion between checkpoints, etc.) is run in response to a run request. However, any other suitable portion of the code can be run.

In variants, when the code 240 is scaled to a secondary machine 40 (e.g., outside of the primary development environment), the code preferably executes on the secondary machine 40 without any code edits, even if the secondary machine 40 is a different type of machine from the primary machine 30 used for code development (e.g., a GPU instead of a CPU).

In a first example, the code 240 is executed on the secondary machine 40 without any manual edits, wherein the control plane can automatically determine the machine type and automatically insert code snippets (e.g., "device=torch.device("cuda")") specific to the secondary machine type. The control plane can determine the machine type using a priori knowledge (e.g., known to the control plane because the control plane is initializing the secondary machine), by detecting the machine type (e.g., detecting the device type), and/or otherwise determining the machine type.

In a second example, the code 240 is executed on the secondary machine 40 without any edits at all. In this example, the code can be compiled to a binary or lower-level machine code that can be read by multiple machine types.

In a third example, the code 240 can be compiled and optimized for the secondary machine 40. For example, the code can be compiled and optimized using the method described in U.S. application Ser. No. 18/752,104 filed 24 Jun. 2024, incorporated herein in its entirety by this reference.

In a fourth example, each device type (machine type) can be associated with a device-specific module (e.g., device class), wherein each module includes a standard set of submodules (e.g., functions), each identified using a standard submodule name (e.g., start( ), stop( ), etc.), but including device type-specific code. In an illustrative example, the same submodule for a CPU and GPU module would include the same submodule name, but include CPU and GPU-specific logic, respectively. In this example, when a standard submodule is called in the code, the submodule from the machine's device type module can be selected and executed. In specific examples, the code 240 can be written, compiled, and/or executed on the secondary machine 40 using the methods described in U.S. application Ser. No. 18/241,940 filed 4 Sep. 2023 and/or U.S. application Ser. No. 17/833,421 filed 6 Jun. 2022, each of which is incorporated herein in its entirety by this reference. In another specific examples, the code 240 can be written and run using the PyTorch Lightning library (e.g., PyTorch Lightning modules).

However, the code can be compiled and optimized in any other manner.

In variants, a project 200 can be a development instance, a production instance ("job"), or another instance type.

A development project instance functions to enable project editing, and can be used for development, testing, validation, staging, production, and/or otherwise used. The development instance can include an editable environment (e.g., development environment, where packages can be installed or uninstalled, dependencies can be set, etc.), editable code, editable machine settings (e.g., the user can set the number of machines, the machine type, etc. to be used for code execution), and/or other characteristics. The development project instance is preferably run on a primary machine type (e.g., example shown in FIG. 11), but can alternatively be run on other machine types. The primary machine type is preferably a CPU or another machine type with a single core (e.g., microprocessor, etc.), and is preferably not a GPU, TPU, or any machine with multiple cores, but can alternatively be a GPU, TPU, or other machine type. A single development instance of a project is preferably supported by the platform (e.g., wherein one or more users can collaborate within the development instance); alternatively, multiple development instances of the same project can be contemporaneously supported. The development instance can automatically shut off once the instance is idle (e.g., when no activity is detected after a threshold period of time, using the shutdown submodule for the primary machine type), which can free up the machine for other processes; alternatively, the development instance can persist on the machine or be otherwise managed.

However, the development instance can be otherwise configured.

The production project instance ("job", "production instance") functions to run the project. In examples, the production project instance can function as a non-interactive, parallel execution of the project, and can be used for non-interactive, parallel workloads.

The production project instance is preferably generated from a development project instance, but can be partially derived from the development instance or otherwise determined. All or a portion of the production project instance can be: forked, cloned, copied, replicated, and/or otherwise generated from the development project instance. The production project instance is preferably a static version of the development instance (e.g., frozen on the development instance version at the time of production project instance creation), but can alternatively be dynamic (e.g., updates whenever the development instance updates. In a first example, the production instances are static; when a user pushes an update from the development instance to production, a new production instance is created from the updated development instance, and the old production instance is deprecated. In a second example, the production instance is updated with the differences between the old production instance and the updated development instance when the user pushes an update. However, the production project instance can be otherwise related to the parent development instance.

The production project instance is preferably exactly the same as the parent development project instance (e.g., which can ensure that code execution will not fail), but can alternatively be different (e.g., optimized for the production instance's machine type).

The production project instance preferably includes the same environment as the parent development project instance, but can alternatively include a superset of the development instance environment, a subset of the development instance environment, an entirely different environment, and/or include any other environment. For example, the production project instance can include the same packages, dependencies, settings (e.g., network configurations), and/or other components of the parent development instance. In another example, the production project instance can be updated to be production-ready (e.g., include code, modules, or packages for distributed computing, for parallelized computing, for monitoring code execution, for monitoring environment or project state, etc.). The production project instance's environment can include a fork, snapshot, logical snapshot, copy, clone, and/or other duplicate of the parent development project instance's environment, or be otherwise created.

The production project instance preferably includes the same code as the parent development project instance (e.g, unmodified code, wherein the execution libraries or frameworks can handle device-specific calls), but can alternatively include different code (e.g., with calls to force device type usage, with optimizations for the device type, etc.). In a first example, the code can be optimized by replacing code segments with more efficient code (having the same functionality) for the secondary machine 40 running the production instance. In a second example, device calls (e.g., “device=torch.device(“cuda”))”) can be inserted into the code to force the code to use the secondary machine or computational features of the secondary machine. However, the code can be otherwise modified or unmodified. The modifications can be performed by: the control plane (e.g., since the control plane has a priori knowledge of the secondary machine that the production instance will be running on), the environment, the code, and/or by any other suitable component.

However, other components of the production project instance can otherwise be the same as or vary from the parent development project instance. The production project instance is preferably uneditable (e.g., static), but can alternatively be editable.

The production project instance is preferably run on a secondary machine type (e.g., example shown in FIG. 11), but can alternatively be run on the primary machine type and/or other machine types. The secondary machine type is preferably a GPU, but can alternatively be a TPU, IPU, CPU, or other machine type. The production project instance is preferably associated with a predetermined set of secondary machine parameters (e.g., number and type of machines to use when executing the production instance, etc.; examples shown in FIG. 14A and FIG. 14B), but can alternatively run on any set of secondary machines.

The platform preferably supports any number of production project instances, but can alternatively contemporaneously support a single production project instance. In variants, each set of production instances can be orchestrated by an auxiliary process executing on another machine (e.g., a CPU), by the control plane, by an auxiliary process executing on the same machine as a production instance, and/or by any other suitable orchestrator (e.g., configured to specify what data to read and/or write for each production instance). In variants, data generated by each production instance is preferably written to the shared datastore; however, the data can be written to separate (e.g., isolated) datastores. However, multiple production instances can be otherwise managed.

The production instance can be created in response to: a request, a single action on an interface (e.g., provided by the control plane, associated with the project, etc.), a series of actions, and/or in response to any other event (run event) or condition being met. Examples of single actions can include: a run command (e.g., a button press, a terminal command, etc.) received on the development project or the development interface; a request received at a URI associated with the production instance; a request received at an API associated with the production instance; a receiving a request to run the project on a set of secondary machines (e.g., specified by a set of parameters, such as the number and type of machines) at the control plane; a request to execute the code on secondary hardware; and/or any other suitable action. The production instance can be created if another production instance of the project is not currently running, when a subsequent action or request is received, and/or at any other time. Creating the production instance can include: optionally replicating the development environment, initializing a set of secondary machines, initializing the environment on the secondary machines, and executing all or a portion of the code (e.g., from a checkpoint onward, etc.) within the environment on the secondary machines. The set of secondary machines can be defined by a set of secondary machine parameters, which can be specified by a user, be preassociated with the production instance (e.g., default production machine parameters, production machine parameters set by the project author, etc.), and/or be otherwise determined.

In a first illustrative example, the project instance can be created in response to receipt of a run command on the development interface, wherein the run command is associated with a number of machines, one or more machine types, and/or other secondary machine parameters. The secondary machine parameters can be selected by the user, be default settings, or be otherwise determined. When the run command is received, the control plane can automatically initialize the selected number of the selected type of machine, replicate the development instance, initialize the environment on the initialized machines, and run the code on the initialized environment, without any additional user input. The run command can be the same command as the command to run a development instance of the project (e.g., wherein the development instance can be run on a default set of primary machines), or be a different command. In variants, the development instance can be used as the production instance of a project (e.g., exposed to other users through an API, URI, etc.).

Figure 13:
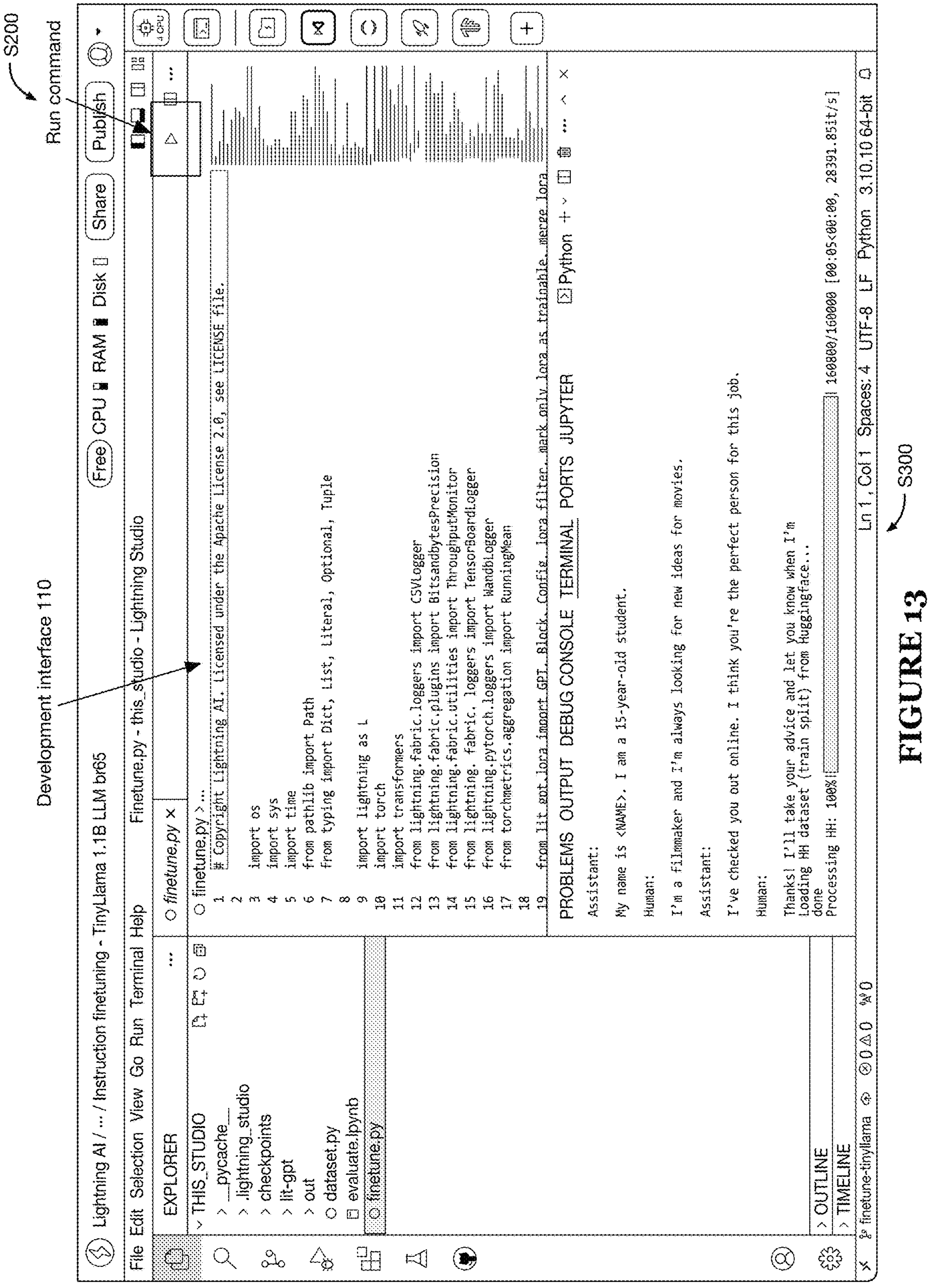
FIG. 13 is an illustrative example of a cloud-based development interface, including a run command button.

In a second illustrative example, the project instance can be initialized in response to receipt of an interface request (e.g., URI request, API request, etc.) at the control plane. In this example, the control plane can receive the interface request; determine whether a production instance of the project should be created; respond to the interface request using an already-running production instance if not; and create a production instance of the project if it should be created. The control plane preferably automatically creates the production instance without any user input, but can alternatively request parameters, approval, or other information or intervention from the project author. The control plane can determine that the production instance should be created based on: a set of default rules, user-specified rules, and/or using another decision making method. For example, the production instance can be created when: no other production instance of the project is running, when the load on the other production instances is too high, and/or when any other condition is met. The control plane can create the production instance by: retrieving the data object(s) for the production instance (e.g., snapshot, image, etc.); determining the machine parameters for the production instance (e.g., from stored settings specified when the user initially created the production instance, such as by selecting the parameters, then selecting the run button, example shown in FIG. 6A, FIG. 6B, and FIG. 13); initializing the secondary machines based on the machine parameters; initializing the environment(s) on the secondary machines using the data object(s); and running the code on the environment(s).

However, the production instance can be generated at any other time.

The production instance can automatically shut off once the instance is idle (e.g., when no activity is detected after a threshold period of time), which can free up the machine for other processes; alternatively, the production instance can persist on the machine or be otherwise managed.

In variants, the production instance can be monitored by one or more monitoring modules. The monitoring modules can be installed within the environment (e.g., in the same or separate container from the code), in a separate environment or container from the environment, and/or otherwise installed. The monitoring modules can monitor: project state, code state, environment state, machine state, model state, and/or any other suitable component. In variants, the monitoring module can stream the component information (e.g., environment metrics, project metrics, code metrics, model metrics, etc.) to the control plane, wherein the control plane can surface the information to the user in real- or near-real time (e.g., streamed via a browser, web interface, or other interface). In variants, this can be done for one or more project instances concurrently executing on one or more machines. In examples, the information can be surfaced to the user without requiring the user to SSH or otherwise access the project machines. However, the monitoring modules can be otherwise configured.

However, the production instance can be otherwise configured.

However, a project 200 can be otherwise configured.

However, a virtual space can be otherwise configured.

In variants, the platform 100 can optionally include a runtime of the system, which can function to rapidly set up computing environments (e.g., new computing environments) on one or more machines (e.g., remote machines). In variants, the runtime can set up computing environments without using Kubernetes or another cluster orchestrator (e.g., by directly using the EC2 API); alternatively, the runtime can use a third party cluster orchestrator. The runtime is preferably machine agnostic (e.g., can be used with any type of machine), but can alternatively be specific to a machine type (e.g., CPU runtime, GPU runtime, etc.).

In variants, the runtime can include or access a project image, an access template, and/or any other suitable component.

The project image can be used to create a computing environment within a machine (e.g., remote machine). In variants, using a project image to initialize a computing environment can be preferred to downloading the programs and libraries needed to fully set up the computing environment because using the machine image can be faster—machine learning libraries can be extremely large and would require a long time to fully download and load. The project image can be: a system image, disk image, binary file, and/or otherwise configured. The system can include a single project image for all operating systems or include a different version of the project image for each operating system. The project image can include subimages for: environments, code, containers (e.g., Docker images), code editors, file access (e.g., to access files on the unified file structure), and/or other subimages. The project image can be generic across all users, specific to a user, specific to a program (e.g., generated from the development environment used to develop the program), and/or otherwise shared or specific.

In a first variant, the project image is shared across all users (e.g., generic), and generated infrequently (e.g., once, each time a new generic computing environment is created, etc.). In this variant, the dependencies can be loaded onto the new computing environment by tracking the installation calls (e.g., pip install, cuda, etc.) used in the development environment, and calling the same set of installation calls in the new computing environment.

In a second variant, the project image (and/or subimage, such as the container image) is specific to a program or development environment (e.g., example shown in FIG. 3), and generated periodically during program development. In this variant, the machine image can also include images of the dependencies (e.g., libraries, etc.).

However, the runtime can otherwise set up the new computing environment (e.g., on the remote machines).

The access template can be used to provide secured communication between the platform and the new computing environment (e.g., the daemon or orchestrator controlling the containers). The access template can be a cloud-init template and/or use any other suitable distribution package. The access template preferably includes a digital certificate, such as a TLS certificate, a SSL certificate, and/or any other suitable certificate, but can alternatively otherwise authorize the platform's identity and/or encrypt communication. The access template (e.g., the certificate) can be determined (e.g., generated, obtained from a certificate provider, etc.) by the platform, but can alternatively be determined by any other suitable entity.

However, the runtime can be otherwise configured.

However, the system can be otherwise configured.

4. Method

In variants, the method can include: supporting project development on a primary machine S100; determining a run event S200; and running the project on a set of machines S300. The method is preferably performed by the system described above, more preferably by a cloud-based platform (e.g., as described above), but can alternatively be performed by another component of the system described above, or by any other suitable system. All or portions of the method can be performed one or more times for one or more users, one or more run event occurrences, and/or at any other suitable time.

Supporting project development S100 functions to enable a user to develop code (e.g., a program, a model, a workflow, etc.). S100 is preferably performed by the control plane (e.g., platform), but can alternatively be performed by any other system component. S100 is preferably performed using a set of primary machines, but can alternatively be performed using secondary machines and/or other machines. In variants, S100 can include providing a cloud-based development interface (e.g., cloud-based IDE, etc.), wherein the user can create the project within the development interface. Creating the project can include: setting up the environment (e.g., installing packages, creating dependencies, specifying environmental variable values, etc.); writing code; optionally specifying the secondary machine parameters (e.g., number and type of machine); and/or otherwise creating the project. In an illustrative example, the control plane can initialize a set of primary machines when the user opens a project on the development interface, optionally load project information from a prior development session (e.g., initialize the environment using a project snapshot, binary, or other representation, etc.), and provide the tools for the user to develop the project within the development interface. In an illustrative example, the user can develop the project as if they were developing the project on a local machine, but the project (e.g., environment, code, etc.) are all hosted by a remote primary machine instead of being hosted on the local machine. However, S100 can be otherwise performed.

Determining a run event S200 functions to determine when a production instance of the project should be created. S200 can be used to: test the project, validate the project, scale the project (e.g., publish the project; expose an interface for other users to access capabilities of the project, etc.), and/or otherwise used. In examples, S200 is not limited to pushing the project to production. S200 can be performed during S100, after S100, without a preceding S100 instance in the session (e.g., when the project is in production), and/or at any other time. The run event can be determined: during development (S100), after development is finished, after a predetermined set of tests have been completed, and/or at any other time. Examples of the run event can include the events or conditions discussed above (e.g., request receipt, series of actions receipt, single action receipt, interface request receipt, etc.), and/or any other run event. In an example, S200 can include receiving a run command (e.g., from a button press, from a terminal or CLI command, etc.) associated with a set of machine parameters, wherein the machine parameters can be used to set up the set of machines for S300. In a first illustrative example, S200 includes receiving the run command in association with no machine parameters or in association with machine parameters that match the set primary machines (e.g., that is supporting project development in S100). In this example, S300 can include running the code on the set of primary machines, without initializing secondary machines. In a second illustrative example, S200 includes receiving the run command in association with a set of secondary machine parameters, including more machines and/or different machine types from the primary machine 30. In this example, S300 can include setting up a set of secondary machines (e.g., having the specified number and type of machines) and running the code on the secondary machines. In third illustrative example, a user can deploy multiple applications, each associated with a URI. Whenever an application request is received (e.g., by the control plane), the control plane can route the request to one of the multiple applications (e.g., based on load, latency, etc.). However, S200 can be otherwise performed.

Running the project on a set of machines S300 functions to execute the project's code within the project's environment. S300 is preferably performed after S200, but can additionally or alternatively be performed before S200, during S100, and/or at any other time. S300 is preferably coordinated by the control plane, but can additionally or alternatively be coordinated by the project itself, by another project, and/or by any other suitable component.

In a first variant, S300 includes executing the project (e.g., development instance) on the set of primary machines 30 (e.g., development machines). This functions to enable the user to test, validate, and/or otherwise evaluate their project (e.g., code, environment, etc.). This variant can be: used in the development stage; used when the machine parameters match the primary machine set's parameters (e.g., number, machine type, etc.), and/or at any other time. In this variant, the control plane can execute the code on the machines hosting the development instance of the project (e.g., wherein the machines were already initialized to host project development).

In a second variant, S300 includes executing the project (e.g., production instance) on a set of secondary machines 40 (e.g., production machines, scaling machines). This functions to enable the user to scale the project, and can also enable other users to access the project or artifacts thereof. This variant can be used: in the development stage (e.g., to test whether the project scales as desired), for production (e.g., to expose the project to other users), and/or at any other time. The resultant project instance (secondary project instance) can run in parallel with the original project instance, such that the original project can continue to be developed (e.g., edited) while the secondary project instance is running.

In this variant, S300 can include, in response to receiving a run request associated with a set of machine parameters for secondary machines: replicating the project (e.g., replicating the development project, including the environment, the code, etc.); initializing the set of secondary machines 40 specified by the set of machine parameters (e.g., the number and type of secondary machine); initializing the project environment on the set of secondary machines; and running the code on the set of secondary machines 40. The project can be replicated before, after, or concurrently with secondary machine initialization. For example, the project can be periodically replicated during development (e.g., such that different versions of the project are saved), replicated when the run event occurs, and/or replicated at any other time. Replication can include: cloning, forking, snapshotting, generating a configuration file, copying, and/or otherwise replicating the project. The project can be replicated or persisted at one or more levels, such as by storing a configuration file (e.g., including the list of packages, dependencies, environmental variables, etc.), storing an image of the project itself, storing the binary of the project, storing a configuration file and a set of package or installation images, and/or otherwise replicated or stored. Initializing the secondary machines can include allocating the specified number and type of machines from the platform to the virtual space; using the user's credentials to initialize the specified number and type of machines on a third party cloud provider; accessing the user's machines having the specified type; and/or otherwise initializing the secondary machines. Initializing the environment on the machines can include: loading a snapshot, clone, or fork of the project onto the machine (e.g., within a container on the machine, etc.); downloading and/or installing project packages specified by the configuration file; and/or otherwise initializing the environment. The code or a portion thereof can then be run on the environment(s). A separate instance of the project is preferably initialized on each machine; however, multiple instances of the project can be initialized on a machine; a single instance of the project can span multiple machines (e.g., using distributed computing); and/or any other number of projects can be initialized on any other number of machines.

However, S300 can be otherwise performed.

In an illustrative example, the control plane can initialize or allocate a cloud-based primary machine (e.g., a set of CPUs) to a user when the user opens a development interface session on the user's device (e.g., remote from the primary machine). The user can then develop a project, using the development interface, by setting up an environment (e.g., runtime environment) and authoring code. The user can then test the project by selecting a run button on the development interface (e.g., without changing the machine parameters), wherein the control plane can automatically run the code within the environment set up on the primary machine. After testing and validating on the primary machine, the user can scale the current version of the project by selecting a set of production machine parameters (e.g., machine type, such as GPU, TPU, IPU, CPU, etc.; number of machines; cost limits; load limits; etc.) and selecting the run button on the development interface (e.g., the same button), which, in variants, can send a request to the control plane including a project identifier and the machine parameters. The control plane can automatically initialize the requested number and type of secondary machines (or allocate said machines to the virtual space), replicate the project (e.g., from the development interface, from the primary machines, etc.), initialize the project on the secondary machines (e.g., set up the project's environment on the secondary machines), and run the code on the secondary machines. In parallel, the user can continue to develop and/or run the code on the primary machines. The control plane can optionally generate one or more interfaces for the replicated project instances and/or the primary project instance, which can be accessed by third parties to access the application enabled by the code.

In a second illustrative example of system usage, a user can initialize an instance of the system (e.g., on a browser, a web application, etc.). The instance can be hosted on the user's local computing system, on a platform computing system, or on a remote computing system associated with the user (e.g., via the user's cloud platform account). When the instance of the system is initialized, the unified file structure (e.g., all databases, all public databases, all databases that the user is authorized to access, etc.) associated with the platform can be automatically mounted to the system (VDE) instance; the user can optionally select which data from the databases to synchronize (e.g., copy to the machine running the VDE instance) and/or which data they want to reference (e.g., read), wherein the VDE can synchronize the first set of data, and create symbolic links for the second set of data (e.g., without downloading the second set of data). The user can optionally install dependencies on the machine running the VDE instance, wherein the platform can automatically create images (e.g., machine images) of the updated development environment and/or track the dependency installation calls. During and/or after code development, the user can select a number and type of machines to execute all or portions of the code on (e.g., using a drop-down of machine type and number options, by IP address, by machine identifier, etc.); examples shown in FIG. 6A and FIG. 6B. The platform can then initialize the selected number of the selected type of machines in the background, independent of and/or concurrent with user code development and/or VDE usage. In examples, initializing a machine can include using the runtime to load the machine image and an access template onto the machine, securely connecting to the initialized machine using the data in the access template (e.g., the certificates in the access template), and controlling the machine to start running components in the machine image (e.g., initialize containers, mount the unified file structure, etc.).

However, the method can be otherwise performed.

Variants of the system and/or method can use any of the systems and/or methods described in U.S. application Ser. No. 18/241,940 filed 4 Sep. 2023, U.S. application Ser. No. 18/633,118 filed 11 Apr. 2024, U.S. application Ser. No. 17/833,421 filed 6 Jun. 2022, U.S. application Ser. No. 17/988,983 filed 17 Nov. 2022, U.S. application Ser. No. 18/404,600 filed 4 Jan. 2024, and/or U.S. application Ser. No. 18/752,104 24 Jun. 2024, each of which are incorporated in their entireties by this reference.

SPECIFIC EXAMPLES

Specific example 1. A method for machine learning application development, comprising, at a client system: exposing the environment executing on a remote CPU to a user via a web interface; receiving application code developed by the user through the web interface; in response to performance of a single action on the web interface, sending a request, comprising a set of hardware selections, to a control plane; and, at a server of the control plane: receiving the request; initializing hardware according to the set of hardware selections; running a static fork of the environment on the hardware, wherein the forked environment comprises packages and configurations from the environment, without reinstalling the packages; executing the application code, developed within the environment on the CPU, using the forked environment on the hardware without changes to the application code; and in response to satisfaction of a timeout condition, shutting down the forked environment on the hardware.

Specific Example 2. The method of Specific Example 1, wherein the hardware preferences comprise a type of hardware.

Specific Example 3. The method of Specific Example 2, wherein the type of hardware comprises a graphics processing unit (GPU).

Specific Example 4. The method of Specific Example 1, further comprising automatically installing a monitoring module on the hardware, wherein metrics output by the monitoring module are streamed to the web interface in real time Specific Example 5. The method of Specific Example 1, wherein the single action comprises a request to execute the application code on the hardware.

Specific Example 6. A method for machine learning application development, comprising: supporting an environment executing on a CPU; exposing the environment to a user via a web interface, wherein the user develops application code within the environment through the web interface; and in response to performance of a single action on the web interface, automatically: initializing a graphics processing unit (GPU); running a static fork of the environment on the GPU, wherein the forked environment comprises packages and configurations from the environment, without reinstalling the packages; executing the application code, developed within the environment on the CPU, using the forked environment on the GPU without changes to the application code; and in response to satisfaction of a timeout condition, shutting down the forked environment on the GPU.

Specific Example 7. The method of Specific Example 6, wherein the environment is associated with a user, wherein the GPU is initialized on a cloud computing provider using credentials of the user.

Specific Example 8. The method of Specific Example 6, wherein the GPU and CPU are each associated with a GPU device module and CPU device module, respectively, wherein each device module comprises the same set of submodules, wherein each submodule comprises device-specific logic, wherein executing the application code without changes comprises executing a submodule from the GPU device module for a device-specific call within the code.

Specific Example 9. The method of Specific Example 6, wherein the application code continues executing when the web interface is closed.

Specific Example 10. The method of Specific Example 6, further comprising exposing a uniform resource identifier (URI) for the application code executing on the GPU, wherein the single action comprises receiving a request at the URI.

Specific Example 11. The method of Specific Example 6, further comprising a plurality of environments, wherein all environments are communicatively connected to a shared database.

Specific Example 12. The method of Specific Example 11, wherein code executing in an environment of the plurality of environments uses outputs written to the database by code from another environment.

Specific Example 13. The method of Specific Example 11, wherein the plurality of environments are organized into a pipeline, wherein code executing in preceding environments write outputs to the shared database, and code executing in succeeding environments uses the outputs read from the shared database.

Specific Example 14. A method for machine learning development, comprising, in response to a single action being performed on a runtime environment running on a first device, automatically: initializing a second device having a different device type from the first device; forking the runtime environment; running the forked runtime environment on the second device; executing code, developed on the first device, on the second device without manual changes to the code; and writing outputs generated by the code to a shared database accessible by the runtime environment.

Specific Example 15. The method of Specific Example 14, wherein the first device comprises a CPU and the second device comprises a GPU.

Specific Example 16. The method of Specific Example 14, wherein the runtime environment comprises a set of packages, wherein the forked runtime environment is run without reinstalling the set of packages.

Specific Example 17. The method of Specific Example 14, wherein executing code on the second device without manual changes comprises: determining a computing resource module for the device type of the second device, the computing resource module comprising a set of standard submodules comprising a standard submodule identifier and device-specific logic; executing the standard submodule from the computing resource module when the standard submodule identifier is detected in the code.

Specific Example 18. The method of Specific Example 17, wherein the first device is associated with a first computing resource module, wherein the first computing resource module comprises the same set of standard submodules, wherein each standard submodule comprises logic specific to the first device.

Specific Example 19. The method of Specific Example 14, further comprising automatically shutting down the second device after the forked runtime environment has idled for a threshold duration.

Specific Example 20. The method of Specific Example 19, wherein shutting down the second device comprises snapshotting the forked runtime environment before shutting down the second device, the method further comprising: receiving a request to execute the code on the forked runtime environment; initializing a third device using the snapshot of the forked runtime environment; and executing the code on the third device.

All references cited herein are incorporated by reference in their entirety, except to the extent that the incorporated material is inconsistent with the express disclosure herein, in which case the language in this disclosure controls.

Optional elements in the figures are indicated in broken lines.

Different processes and/or elements discussed above can be defined, performed, and/or controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be manually defined, be custom instructions, be standardized instructions, and/or be otherwise defined. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements (and/or variants thereof) discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A method for machine learning application development, comprising:
- at a client system:
  - exposing an environment executing on a remote computer processing unit (CPU) to a user via a web interface;
  - receiving application code developed by the user through the web interface;
  - in response to performance of a single action on the web interface, sending a request, comprising a set of hardware selections, to a control plane;
- at a server of the control plane:
  - receiving the request;
  - initializing hardware according to the set of hardware selections, wherein the hardware comprises non-CPU hardware;

running a static fork of the environment on the hardware, wherein the forked environment comprises packages and configurations from the environment, without reinstalling the packages;

enabling instantaneous forked environment access to data within a unified database, comprising:

mounting a plurality of remote distributed databases storing the data to a local repository of the forked environment;

utilizing a routing table maintained by the control plane that associates a user identifier with a machine identifier of each remote distributed database of the plurality;

synchronizing a strict subset of the data with the local repository of the forked environment; and creating symbolic links to a remainder of the data, wherein the symbolic links enable read access without downloading the remainder of the data to the local repository associated with the forked environment, and wherein a size of the unified database exceeds a storage size of the forked environment; and executing the application code, developed within the environment on the CPU, using the data within the unified database, within the forked environment on the hardware without changes to the application code; and in response to satisfaction of a timeout condition, shutting down the forked environment on the hardware.

2. The method of claim 1, wherein the set of hardware selections comprise a type of hardware.

3. The method of claim 2, wherein the type of hardware comprises a graphics processing unit (GPU).

4. The method of claim 1, further comprising automatically installing a monitoring module on the hardware, wherein metrics output by the monitoring module are streamed to the web interface in real time.

5. The method of claim 1, wherein the single action comprises a request to execute the application code on the hardware.

6. A method for machine learning application development, comprising:

supporting an environment executing on a computer processing unit (CPU);

exposing the environment to a user via a web interface, wherein the user develops application code within the environment through the web interface; and in response to performance of a single action on the web interface, automatically:

initializing a graphics processing unit (GPU);

running a static fork of the environment on the GPU, wherein the forked environment comprises packages and configurations from the environment, without reinstalling the packages;

enabling instantaneous forked environment access to data within a unified database, comprising:

mounting a plurality of remote distributed databases storing the data to a local repository of the forked environment;

synchronizing a strict subset of the data with the local repository of the forked environment; and creating symbolic links to a remainder of the data, wherein the symbolic links enable read access without downloading the remainder of the data to the local repository associated with the forked environment and wherein a size of the unified database exceeds a storage size of the forked environment; and executing the application code, developed within the environment on the CPU, using the data within the unified database, within the forked environment on the GPU without changes to the application code; and in response to satisfaction of a timeout condition, shutting down the forked environment on the GPU.

7. The method of claim 6, wherein the environment is associated with the user, wherein the GPU is initialized on a cloud computing provider using credentials of the user.

8. The method of claim 6, wherein the GPU and CPU are each associated with a GPU device module and CPU device module, respectively, wherein each device module comprises a same set of submodules, wherein each submodule comprises device-specific logic, wherein executing the application code without changes comprises executing a submodule from the GPU device module for a device-specific call within the application code.

9. The method of claim 6, wherein the application code continues executing when the web interface is closed.

10. The method of claim 6, further comprising exposing a uniform resource identifier (URI) for the application code executing on the GPU, wherein the single action comprises receiving a request at the URI.

11. The method of claim 6, further comprising a plurality of environments, wherein all environments are communicatively connected to a shared database.

12. The method of claim 11, wherein code executing in an environment of the plurality of environments uses outputs written to the shared database by code from another environment.

13. The method of claim 11, wherein the plurality of environments are organized into a pipeline, wherein code executing in preceding environments write outputs to the shared database, and code executing in succeeding environments uses the outputs read from the shared database.

14. A method for machine learning development, comprising:

in response to a single action being performed on a runtime environment running on a first device, automatically:

initializing a second device having a different device type from the first device;

forking the runtime environment, wherein the runtime environment is associated with a set of packages;

running the forked runtime environment on the second device, wherein the set of packages is not preinstalled on the second device;

enabling instantaneous forked environment access to data within a unified database, comprising:

mounting a plurality of remote distributed databases storing the data to a local repository of the forked runtime environment;

synchronizing a strict subset of the data with the local repository of the forked runtime environment; and creating symbolic links to a remainder of the data, wherein the symbolic links enable read access without downloading the remainder of the data to the local repository associated with the forked runtime environment, and wherein a size of the unified database exceeds a storage size of the forked runtime environment; and executing code, developed on the first device, using the data within the unified database, on the second device without manual changes to the code; and writing outputs generated by the code to a shared database accessible by the runtime environment.

15. The method of claim 14, wherein the first device comprises a CPU and the second device comprises a GPU.

16. The method of claim 14, wherein the runtime environment comprises the set of packages, wherein the forked runtime environment is run without reinstalling the set of packages.

17. The method of claim 14, wherein executing the code on the second device without manual changes comprises:

determining a computing resource module for the device type of the second device, the computing resource module comprising a set of standard submodules comprising a standard submodule identifier and device-specific logic;

executing a standard submodule from the set of standard submodules and from the computing resource module when the standard submodule identifier is detected in the code.

18. The method of claim 17, wherein the first device is associated with a first computing resource module, wherein the first computing resource module comprises the set of standard submodules, wherein each standard submodule comprises logic specific to the first device.

19. The method of claim 14, further comprising automatically shutting down the second device after the forked runtime environment has idled for a threshold duration.

20. The method of claim 19, wherein shutting down the second device comprises snapshotting the forked runtime environment before shutting down the second device, the method further comprising:

receiving a request to execute the code on the forked runtime environment;

initializing a third device using the snapshot of the forked runtime environment; and executing the code on the third device.

* * * * *